(12) United States Patent
Xue et al.

(10) Patent No.: US 12,317,221 B2
(45) Date of Patent: May 27, 2025

(54) COMMUNICATION METHOD, COMMUNICATION APPARATUS, AND COMPUTER-READABLE STORAGE MEDIUM

(71) Applicant: HUAWEI TECHNOLOGIES CO., LTD., Shenzhen (CN)

(72) Inventors: Lixia Xue, Beijing (CN); Feng Wang, Beijing (CN); Xu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 17/889,688

(22) Filed: Aug. 17, 2022

(65) Prior Publication Data
US 2022/0394662 A1   Dec. 8, 2022

Related U.S. Application Data

(63) Continuation of application No. PCT/CN2020/075745, filed on Feb. 18, 2020.

(51) Int. Cl.
*H04W 68/00* (2009.01)
*H04W 52/02* (2009.01)

(52) U.S. Cl.
CPC ........ *H04W 68/00* (2013.01); *H04W 52/0229* (2013.01)

(58) Field of Classification Search
CPC .................................................... H04W 68/00
USPC ........................................................ 455/458
See application file for complete search history.

(56) References Cited

U.S. PATENT DOCUMENTS

| 2014/0256365 A1* | 9/2014 | Schmidt ................ H04W 76/14 455/466 |
| 2016/0234804 A1 | 8/2016 | Hu et al. |
| 2018/0270790 A1 | 9/2018 | Shi et al. |
| 2019/0306827 A1* | 10/2019 | Agiwal ................ H04W 68/00 |

FOREIGN PATENT DOCUMENTS

| CN | 102892083 A | 1/2013 |
| CN | 109327889 A | 2/2019 |
| CN | 110475320 A | 11/2019 |
| CN | 110574456 A | 12/2019 |

(Continued)

OTHER PUBLICATIONS

3GPP TSG RAN WG1 Meeting #92,R1-1801430,On "wake-up signal" for eFeMTC,Huawei, HiSilicon,Athens, Greece, Feb. 26-Mar. 2, 2018, total 6 pages.

(Continued)

*Primary Examiner* — Ted M Wang
(74) *Attorney, Agent, or Firm* — HAUPTMAN HAM, LLP

(57) ABSTRACT

A network device and a terminal device both determine, based on an identifier of the terminal device, that the terminal device belongs to a first terminal device group on a first PO, where the first terminal device group is one of X terminal device groups on the first PO. The network device sends paging DCI on the first PO, where the paging DCI includes first indication information, and the first indication information is used to indicate a terminal device in the first terminal device group to receive a paging physical downlink shared channel PDSCH. The network device sends the paging PDSCH to the terminal device.

16 Claims, 5 Drawing Sheets

(56) References Cited

FOREIGN PATENT DOCUMENTS

| CN | 113260023 A | 8/2021 |
|---|---|---|
| CN | 115053543 B | 11/2023 |
| WO | 2008155739 A2 | 12/2008 |
| WO | 2017074156 A1 | 5/2017 |
| WO | 2019047573 A1 | 3/2019 |
| WO | 2019047770 A1 | 3/2019 |
| WO | 2019160463 A1 | 8/2019 |
| WO | 2020032849 A1 | 2/2020 |

OTHER PUBLICATIONS

Huawei et al: "UE Power saving in RRC_IDLE mode", 3GPP DRAFT; R1-1810714,Sep. 29, 2018, pp. 1-3, XP051518118, total 3 pages.

ZTE Corporation: "Consideration on UE ID of PO calculation for NB-IoT connection to 5GC", 3GPP Draft; R2-1914723, Nov. 8, 2019, XP051816722, total 5 pages.

Huawei et al: "NR Paging Options", 3GPP DRAFT; R2-1808440,May 20, 2018, XP051444714, total 11 pages.

Extended European Search Report issued in corresponding European Application No. 20920569.9, dated Jan. 3, 2023, pp. 1-8.

Chinese Office Action issued in corresponding Chinese Application No. 202080095789.7, dated Dec. 28, 2022, pp. 1-11.

Huawei et al, "R1-1812685: UE power saving for paging", 3GPP TSG RAN WG1 Meeting #95, Nov. 16, 2018, total 4 pages.

Huawei et al, "R1-1810714:UE Power saving in RRC_IDLE mode", 3GPP TSG RAN WG1 Meeting #94bis, Oct. 12, 2018, total 3 pages.

3GPP TSG RAN Meeting #86, RP-193239, New WID: UE Power Saving Enhancements, MediaTek Inc.,Sitges, Spain, Dec. 9-12, 2019, total 5 pages.

3GPP TS 38.214 V16.0.0 (Dec. 2019), 3rd Generation Partnership Project; Technical Specification Group Radio Access Network; NR; Physical layer procedures for data(Release 16), 147 pages.

3GPP TS 38.331 V15.8.0 (Dec. 2019), 3rd Generation Partnership Project; Technical Specification Group Radio Access Network;NR-;Radio Resource Control (RRC) protocol specification(Release 15), total 532 pages.

International Search Report issued in corresponding International Application No. PCT/CN2020/075745, dated Nov. 3, 2020, pp. 1-9.

3GPP TSG RAN WG2 Meeting #95, R2-164998,Remaining issues in eDRX PH and PTW calculations,Intel Corporation,Gothenburg, Sweden, Aug. 22-26, 2016, total 5 pages.

3GPP TSG RAN WG1 Meeting #94,R1-1808959,UE-Group WUS in NB-IoT, MediaTek Inc., Gothenburg, Sweden, Aug. 20 24, 2018, total 5 pages.

\* cited by examiner

COMMUNICATION METHOD, COMMUNICATION APPARATUS, AND COMPUTER-READABLE STORAGE MEDIUM

CROSS-REFERENCE TO RELATED APPLICATIONS

This application is a continuation of International Application No. PCT/CN2020/075745, filed on Feb. 18, 2020, the disclosure of which is hereby incorporated in entirety by reference.

BACKGROUND

In a communication system, a terminal device in an idle (IDLE) or inactive (INACTIVE) state needs to monitor a paging occasion (PO) in each discontinuous reception (DRX) cycle. A plurality of terminal devices monitors a same PO. If there is a paged terminal device in the terminal devices, a network device sends, on the PO, paging downlink control information (DCI) that includes scheduling information for paging. After receiving the paging DCI, each of the terminal devices receives a paging physical downlink shared channel (PDSCH) to obtain a paging record list, and determines, based on whether there is a paging record of the terminal device in the list, whether the terminal device is paged. To be specific, even if one of the terminal devices is paged, the terminal devices need to receive the paging PDSCH. For UE that is not paged, power consumption of receiving the paging PDSCH is unwarranted.

SUMMARY

Some embodiments disclose a communication method, a communication apparatus, and a computer-readable storage medium. Terminal devices corresponding to a same PO are classified into a plurality of terminal device groups. In paging DCI, a terminal device that needs to receive a paging PDSCH is indicated by using the terminal device group as a unit, so that at least some terminal devices that receive the paging DCI but are not paged on the paging occasion is unable to receive the paging PDSCH, and this is conducive to energy saving of the terminal device.

According to a first aspect, a communication method is provided, and the method includes: determining, based on an identifier of a terminal device, that the terminal device belongs to a first terminal device group on a first PO, where the first terminal device group is one of X terminal device groups on the first PO; sending paging DCI on the first PO, where the paging DCI includes first indication information, and the first indication information is used to indicate a terminal device in the first terminal device group to receive a paging PDSCH; and sending the paging PDSCH to the terminal device.

The method is performed by a first communication apparatus. The first communication apparatus is a network device, or is a communication apparatus that supports a network device in implementing a function by the method. For example, the first communication apparatus is a chip disposed in the network device.

Based on this method, the network device notifies a terminal device in some terminal device groups belonging to the first PO to receive the paging PDSCH, so that at least some terminal devices that receive the paging DCI but are not paged on the first PO is unable to receive the paging PDSCH. This is conducive to energy saving of the terminal device.

In an optional implementation, the identifier is a UE_ID, and the UE_ID and the first terminal device group meet x=floor (UE_ID/N/Ns) mod X, where x is a number of the first terminal device group, x is an integer from 0 to X−1 (including 0 and X−1), floor indicates rounding down, N is a quantity of paging frames PFs included in a DRX cycle, Ns is a quantity of POs included in the PF, and mod indicates modulo. The UE_ID and a 5G-S-TMSI of the terminal device meet UE_ID=5G-S-TMSI mod 1024, and X meets X×N×Ns≤1024. Alternatively, the UE_ID and a 5G-S-TMSI of the terminal device meet UE_ID=5G-S-TMSI mod (b×1024), and X meets X×N×Ns≤1024×b, where b is a positive integer greater than 1, or b is a positive integer power of 2. Optionally, X is an integer power of 2.

Based on this implementation, terminal devices corresponding to a same PO is classified into a plurality of terminal device groups based on UE_IDs. A value of X is limited by N and Ns. When UE_ID=5G-S-TMSI mod 1024, there is a case in which X is equal to 1. When UE_ID=5G-S-TMSI mod (b×1024), there is not a case in which X is equal to 1. When X is an integer power of 2, quantities of terminal devices included in the terminal device groups are relatively balanced.

In an optional implementation, the identifier of the terminal device is a 5G-S-TMSI, and the 5G-S-TMSI and the first terminal device group meet x=floor (5G-S-TMSI/N/Ns) mod X, where x is a number of the first terminal device group, x is an integer from 0 to X−1 (including 0 and X−1), floor indicates rounding down, N is a quantity of paging frames PFs included in a discontinuous reception DRX cycle, Ns is a quantity of POs included in the PF, and mod indicates modulo.

Based on this implementation, terminal devices corresponding to a same PO is classified into a plurality of terminal device groups based on 5G-S-TMSIs. A value of X is not limited by N or Ns.

In an optional implementation, the identifier of the terminal device is a 5G-S-TMSI, and the 5G-S-TMSI and the first terminal device group meet x=5G-S-TMSI mod X, where x is a number of the first terminal device group, x is an integer from 0 to X−1 (including 0 and X−1), and mod indicates modulo. Optionally, X is an odd number.

Based on this implementation, terminal devices corresponding to a same PO is classified into a plurality of terminal device groups based on 5G-S-TMSIs. A value of X is not limited by N or Ns. When X is an odd number, a better grouping effect is achieved.

In an optional implementation, the first indication information is Y bits, Y meets $Y=1+\log_2 X$, and X meets $X=2^K$, where K is a positive integer. One indication state of the first indication information is used to indicate a terminal device in the X terminal device groups to receive the paging PDSCH. Each of $X/(2^M)$ indication states of the first indication information is used to indicate a terminal device in $2^M$ terminal device groups in the X terminal device groups to receive the paging PDSCH, where M is an integer from 0 to K−1.

Based on this implementation, when a frequency in which the terminal device is paged is low, a false alarm probability of the terminal device is relatively low. In addition, this implementation has flexibility, and a quantity of occupied bits is taken into consideration.

In an optional implementation, the first indication information is Y bits, and Y meets $\mathrm{ceil}(\log_2(X+1)) \leq Y \leq X$, where ceil indicates rounding up. One indication state of the first indication information is used to indicate a terminal device in the X terminal device groups to receive the paging PDSCH. Each of at least one indication state of the first indication information is used to indicate a terminal device in some terminal device groups in the X terminal device groups to receive the paging PDSCH, and the some terminal device groups are at least two terminal device groups. Each of X indication states of the first indication information is used to indicate a terminal device in one of the X terminal device groups to receive the paging PDSCH.

Based on this implementation, when a frequency in which the terminal device is paged is low, a false alarm probability of the terminal device is relatively low. In addition, this implementation has flexibility.

In an optional implementation, the first indication information is Y bits, and Y meets Y=ceil($\log_2$(X+1)), where ceil indicates rounding up. One indication state of the first indication information is used to indicate a terminal device in the X terminal device groups to receive the paging PDSCH. Each of X indication states of the first indication information is used to indicate a terminal device in one of the X terminal device groups to receive the paging PDSCH.

Based on this implementation, when a frequency in which the terminal device is paged is relatively low, a false alarm probability of the terminal device is relatively low.

In an optional implementation, the first indication information is a bitmap of X bits, the X bits are in a one-to-one correspondence with the X terminal device groups, and each of the X bits is used to indicate whether a terminal device in a corresponding terminal device group receives the paging PDSCH.

Based on this implementation, when a frequency in which the terminal device is paged is relatively high, a false alarm probability of the terminal device is relatively low.

According to a second aspect, a communication method is provided, and the method includes: determining, based on an identifier of a terminal device, that the terminal device belongs to a first terminal device group on a first PO, where the first terminal device group is one of X terminal device groups on the first PO; receiving paging DCI on the first PO, where the paging DCI includes first indication information, and the first indication information is used to indicate a terminal device in the first terminal device group to receive a paging PDSCH; and receiving the paging PDSCH based on the paging DCI.

The method is performed by a second communication apparatus. The second communication apparatus is a terminal device, or is a communication apparatus that supports a terminal device in implementing a function by the method. For example, the second communication apparatus is a chip disposed in the terminal device.

Based on this method, the network device notifies a terminal device in some terminal device groups belonging to the first PO to receive the paging PDSCH, so that at least some terminal devices that receive the paging DCI but are not paged on the first PO is unable to receive the paging PDSCH. This is conducive to energy saving of the terminal device.

In an optional implementation, the identifier is a UE_ID, and the UE_ID and the first terminal device group meet x=floor (UE_ID/N/Ns) mod X, where x is a number of the first terminal device group, x is an integer from 0 to X−1 (including 0 and X−1), floor indicates rounding down, N is a quantity of paging frames PFs included in a DRX cycle, Ns is a quantity of POs included in the PF, and mod indicates modulo. The UE_ID and a 5G-S-TMSI of the terminal device meet UE_ID=5G-S-TMSI mod 1024, and X meets X×N×Ns≤1024. Alternatively, the UE_ID and a 5G-S-TMSI of the terminal device meet UE_ID=5G-S-TMSI mod (b×1024), and X meets X×N×Ns≤1024×b, where b is a positive integer greater than 1, or b is a positive integer power of 2. Optionally, X is an integer power of 2.

Based on this implementation, terminal devices corresponding to a same PO is classified into a plurality of terminal device groups based on UE_IDs. A value of X is limited by N and Ns. When UE_ID=5G-S-TMSI mod 1024, there is a case in which X is equal to 1. When UE_ID=5G-S-TMSI mod (b×1024), there is not a case in which X is equal to 1. When X is an integer power of 2, quantities of terminal devices included in the terminal device groups are relatively balanced.

In an optional implementation, the identifier of the terminal device is a 5G-S-TMSI, and the 5G-S-TMSI and the first terminal device group meet x=floor (5G-S-TMSI/N/Ns) mod X, where x is a number of the first terminal device group, x is an integer from 0 to X−1 (including 0 and X−1), floor indicates rounding down, N is a quantity of paging frames PFs included in a discontinuous reception DRX cycle, Ns is a quantity of POs included in the PF, and mod indicates modulo.

Based on this implementation, terminal devices corresponding to a same PO is classified into a plurality of terminal device groups based on 5G-S-TMSIs. A value of X is not limited by N or Ns.

In an optional implementation, the identifier of the terminal device is a 5G-S-TMSI, and the 5G-S-TMSI and the first terminal device group meet x=5G-S-TMSI mod X, where x is a number of the first terminal device group, x is an integer from 0 to X−1 (including 0 and X−1), and mod indicates modulo. Optionally, X is an odd number.

Based on this implementation, terminal devices corresponding to a same PO is classified into a plurality of terminal device groups based on 5G-S-TMSIs. A value of X is not limited by N or Ns. When X is an odd number, a better grouping effect is achieved.

In an optional implementation, the first indication information is Y bits, Y meets Y=1+$\log_2$X, and X meets X=$2^K$, where K is a positive integer. One indication state of the first indication information is used to indicate a terminal device in the X terminal device groups to receive the paging PDSCH. Each of X/($2^M$) indication states of the first indication information is used to indicate a terminal device in $2^M$ terminal device groups in the X terminal device groups to receive the paging PDSCH, where M is an integer from 0 to K-1.

Based on this implementation, when a frequency in which the terminal device is paged is relatively low, a false alarm probability of the terminal device is relatively low. In addition, this implementation has flexibility, and a quantity of occupied bits is taken into consideration.

In an optional implementation, the first indication information is Y bits, and Y meets ceil($\log_2$(X+1))≤Y≤X, where ceil indicates rounding up. One indication state of the first indication information is used to indicate a terminal device in the X terminal device groups to receive the paging PDSCH. Each of at least one indication state of the first indication information is used to indicate a terminal device in some terminal device groups in the X terminal device groups to receive the paging PDSCH, and the some terminal device groups are at least two terminal device groups. Each of X indication states of the first indication information is used to indicate a terminal device in one of the X terminal device groups to receive the paging PDSCH.

Based on this implementation, when a frequency in which the terminal device is paged is relatively low, a false alarm probability of the terminal device is relatively low. In addition, this implementation has flexibility.

In an optional implementation, the first indication information is Y bits, and Y meets Y=ceil($\log_2$(X+1)), where ceil indicates rounding up. One indication state of the first indication information is used to indicate a terminal device in the X terminal device groups to receive the paging PDSCH. Each of X indication states of the first indication information is used to indicate a terminal device in one of the X terminal device groups to receive the paging PDSCH.

Based on this implementation, when a frequency in which the terminal device is paged is relatively low, a false alarm probability of the terminal device is relatively low.

In an optional implementation, the first indication information is a bitmap of X bits, the X bits are in a one-to-one correspondence with the X terminal device groups, and each of the X bits is used to indicate whether a terminal device in a corresponding terminal device group receives the paging PDSCH.

Based on this implementation, when a frequency in which the terminal device is paged is relatively high, a false alarm probability of the terminal device is relatively low.

According to a third aspect, a communication apparatus is provided, and the apparatus includes a module configured to perform the method in the first aspect or any optional implementation of the first aspect, for example, a processing module and a transceiver module.

The transceiver module includes a sending module and a receiving module. The sending module and the receiving module is different function modules, or is a same function module that implements different functions. The processing module is implemented by using a processor. The transceiver module is implemented by using a transceiver. Correspondingly, the sending module is implemented by using a transmitter, and the receiving module is implemented by using a receiver.

If the apparatus is a network device, the transceiver is a radio frequency transceiver component in the network device. If the apparatus is a chip disposed in a network device, the transceiver is a communication interface in the chip, and the communication interface is connected to a radio frequency transceiver component in the network device, to receive/transmit information by using the radio frequency transceiver component.

According to a fourth aspect, a communication apparatus is provided, and the apparatus includes a module configured to perform the method in the second aspect or any optional implementation of the second aspect, for example, a processing module and a transceiver module. The transceiver module includes a sending module and a receiving module. The sending module and the receiving module is different function modules, or is a same function module that implements different functions. The processing module is implemented by using a processor. The transceiver module is implemented by using a transceiver. Correspondingly, the sending module is implemented by using a transmitter, and the receiving module is implemented by using a receiver. If the apparatus is a terminal device, the transceiver is a radio frequency transceiver component in the terminal device. If the apparatus is a chip disposed in a terminal device, the transceiver is a communication interface in the chip, and the communication interface is connected to a radio frequency transceiver component in the terminal device, to receive/transmit information by using the radio frequency transceiver component.

According to a fifth aspect, a communication system is provided, and the communication system includes the network device according to the third aspect and the terminal device according to the fourth aspect.

According to a sixth aspect, a computer-readable storage medium is provided, the computer-readable storage medium includes instructions, and when the instructions are run on a computer, the computer is enabled to perform the method in the first aspect or any optional implementation of the first aspect.

According to a seventh aspect, a computer-readable storage medium is provided, the computer-readable storage medium includes instructions, and when the instructions are run on a computer, the computer is enabled to perform the method in the second aspect or any optional implementation of the second aspect.

According to an eighth aspect, a computer program product is provided, the computer program product includes instructions, and when the instructions are run on a computer, the computer is enabled to perform the method in the first aspect or any optional implementation of the first aspect.

According to a ninth aspect, a computer program product is provided, the computer program product includes instructions, and when the instructions are run on a computer, the computer is enabled to perform the method in the second aspect or any optional implementation of the second aspect.

DESCRIPTION OF EMBODIMENTS

The following describes technical solutions in accordance with embodiments with reference to the accompanying drawings.

The technical solutions in some embodiments is applied to various communication systems, for example, a long term evolution (LTE) system, a 5th generation (5G) system, a new radio (NR) system, or another communication system that emerges in the future.

Figure 1:
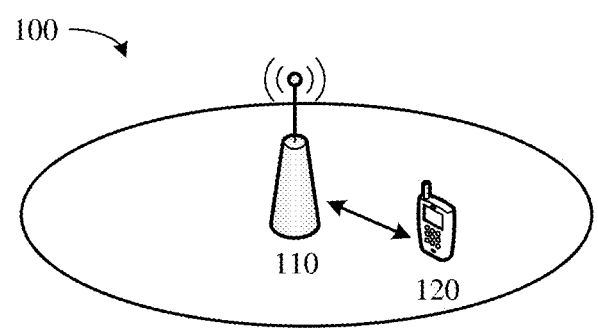
FIG. 1 is a schematic diagram of a communication system in accordance with some embodiments.

FIG. 1 is a schematic diagram of a communication system in accordance with some embodiments. As shown in FIG. 1, the communication system 100 includes at least one network device, for example, a network device 110 shown in FIG. 1. The communication system 100 further includes at least one terminal device, for example, a terminal device 120 shown in FIG. 1. The network device 110 sends a reference signal to the terminal device 120 based on a reference signal resource, and the terminal device 120 obtains CSI by measuring the reference signal. Then, the terminal device 120 reports the CSI to the network device 110, and the network device 110 performs scheduling and processing based on the CSI, for example, select an appropriate modulation and coding scheme (MCS) for transmission of downlink data.

A terminal device in some embodiments is user equipment (UE), an access terminal, a subscriber unit, a subscriber station, a mobile station, a remote station, a remote terminal, a mobile device, a user terminal, a terminal, a wireless communication apparatus, a user agent, or a user apparatus. The terminal device alternatively is a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like. This is not limited.

A network device in some embodiments is a device configured to communicate with a terminal device. For example, the network device is a base station, an evolved NodeB (eNodeB), a transmission reception point (TRP), a next generation NodeB (gNB) in a 5G mobile communication system, a base station in a future mobile communication system, or an access node in a Wi-Fi system. For another example, the network device alternatively is a module or unit that completes a part of functions of a base station, for example, is a central unit (CU) or a distributed unit (DU). For still another example, the network device alternatively is a radio controller in a cloud radio access network (CRAN) scenario, a relay station, an access point, a vehicle-mounted device, a wearable device, or an access network device in another future evolved communication system. A technology and a device form used by the network device are not limited.

In some embodiments, the terminal device or the network device includes a hardware layer, an operating system layer running above the hardware layer, and an application layer running above the operating system layer. The hardware layer includes hardware such as a central processing unit (CPU), a memory management unit (MMU), and a memory (further referred to as a main memory). An operating system is any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, a structure of an execution body of a method provided in accordance with some embodiments is not limited, provided that a program that records code of the method provided in accordance with some embodiments are run to perform communication according to the method provided in accordance with some embodiments. For example, the method provided in some embodiments is performed by the terminal device or the network device, or a function module that is in the terminal device or the network device and that invokes and execute the program.

In addition, aspects or features in accordance with some embodiments is implemented as a method, an apparatus, or a product using standard programming and/or engineering technologies. The term "product" used in some embodiments covers a computer program that is accessed from any computer-readable component, carrier or medium. For example, the computer-readable medium includes but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification represents one or more devices and/or other machine-readable media that are configured to store information. The term "machine-readable media" includes but is not limited to a wireless channel, and various other media that stores, include, and/or carry instructions and/or data.

Before a method in some embodiments is described, some concepts involved are first described.

In a communication system, a terminal device in a dormant or inactive state needs to monitor a PO in each DRX cycle. One DRX cycle includes a plurality of radio frames, such as 32, 64, 128, or 256 radio frames. One DRX cycle includes a plurality of paging frames (PF), and one PF is one radio frame. One PF includes one or more POs, or includes a start point of one PO. One PO is a set of physical downlink control channel (PDCCH) monitoring occasions, and includes a plurality of slots. A network device sends paging DCI in the slots.

A PO that needs to be monitored by the terminal device is determined in the following manner. First, a user equipment identity (UE_ID) of the terminal device is determined based on a formula 1 and based on a 5G-short-temporary mobile subscriber identity (5G-S-TMSI) of the terminal device:

$$\text{UE\_ID} = \text{5G-S-TMSI} \bmod 1024 \quad \text{(Formula 1)}$$

Then, a PO in a PF in a DRX cycle that needs to be monitored by the terminal device is determined based on a formula 2 and based on the UE_ID of the terminal device:

$$(SFN + PF\_\text{offset}) \bmod T = (T \text{ div } N) \times (\text{UE\_ID} \bmod N) \quad \text{(Formula 2)}$$

SFN is a system frame number (SFN) of the PF, PF_offset is an offset of the PF, mod indicates modulo, T is a quantity of radio frames included in the DRX cycle, div indicates division, and N is a quantity of PFs included in the DRX cycle.

Finally, a PO in the PF that needs to be monitored by the terminal device is determined based on a formula 3 and based on the UE_ID of the terminal device:

$$i\_s = \text{floor}(\text{UE\_ID}/N) \bmod Ns \quad \text{(Formula 3)}$$

Herein, i_s is an index of the PO, floor indicates rounding down (that is, rounding in a negative infinity direction), N is a quantity of PFs included in the DRX cycle, and Ns is a quantity of POs included in the PF.

Figure 2:
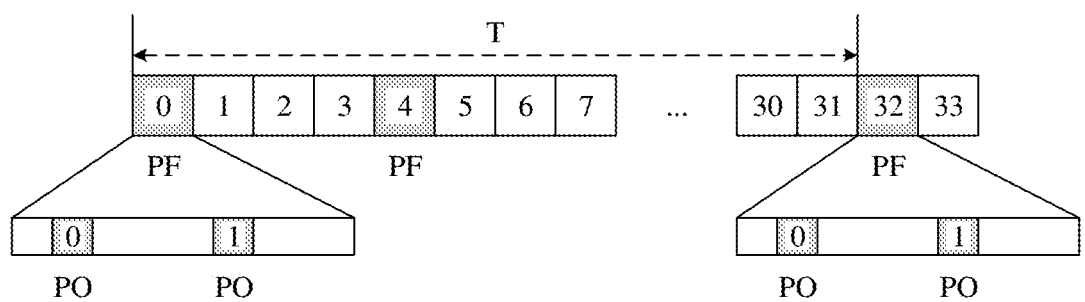
FIG. 2 is a schematic diagram of a distribution situation of a paging occasion in accordance with some embodiments.

FIG. 2 shows a distribution situation of POs when one DRX cycle includes 32 radio frames (in other words, T=32) and eight PFs (in other words, N=¼T=8), one PF includes two POs (in other words, Ns=2), and the offset of the PF is 0 (in other words, PF_offset=0).

If UE_IDs of terminal devices are separately 0, 8, 16, 24, and 32, because values obtained after the UE_IDs modulo 8 are 0, the terminal devices correspond to the first PF (that is, a PF 0) in the DRX cycle. In addition, values obtained after the UE_IDs undergo processing of floor (UE_ID/8) are respectively 0, 1, 2, 3, and 4, and values obtained after the values modulo 2 are 0, 1, 0, 1, and 0. Therefore, terminal devices whose UE_IDs are 0, 16, and 32 correspond to the first PO (that is, a PO 0) of the first PF, and terminal devices whose UE_IDs are 8 and 24 correspond to the second PO (that is, a PO 1) of the first PF.

If a terminal device in a dormant or inactive state is paged, the network device sends paging DCI on a PO corresponding to the terminal device. Accordingly, the terminal devices monitor the PO to receive the paging DCI. After receiving the paging DCI, the terminal device receives a paging PDSCH based on the paging DCI, to obtain a paging record list. The paging record list includes a maximum of 32 paging records, and one paging record includes an identifier of one terminal device. The identifier is an NG-5G-S-TMSI (48 bits) or an I-RNTI-Value (40 bits). If a paging record that includes the identifier of the terminal device exists in the paging record list, the terminal device determines that the terminal device is paged.

In other words, provided that there is a paged terminal device in terminal devices corresponding to a PO, the network device sends the paging DCI on the PO, to indicate the terminal devices corresponding to the PO to receive the paging PDSCH. A terminal device that is not paged in the terminal devices further needs to receive the paging PDSCH. Therefore, power consumption for receiving the paging PDSCH is wasted, and this is not conducive to energy saving of the terminal device.

Therefore, a plurality of methods are provided to resolve this problem. In the methods, terminal devices corresponding to a same PO is classified into a plurality of terminal device groups. In paging DCI, a terminal device that needs to receive a paging PDSCH is indicated by using the terminal device group as a unit. In this way, in response to no terminal devices in a terminal device group being called, the terminal device in the group is unable to receive the paging PDSCH. In different methods, how to group terminal devices, how to indicate a terminal device in a unit of groups, how to configure a quantity of terminal device groups, and the like are different.

Figure 3:
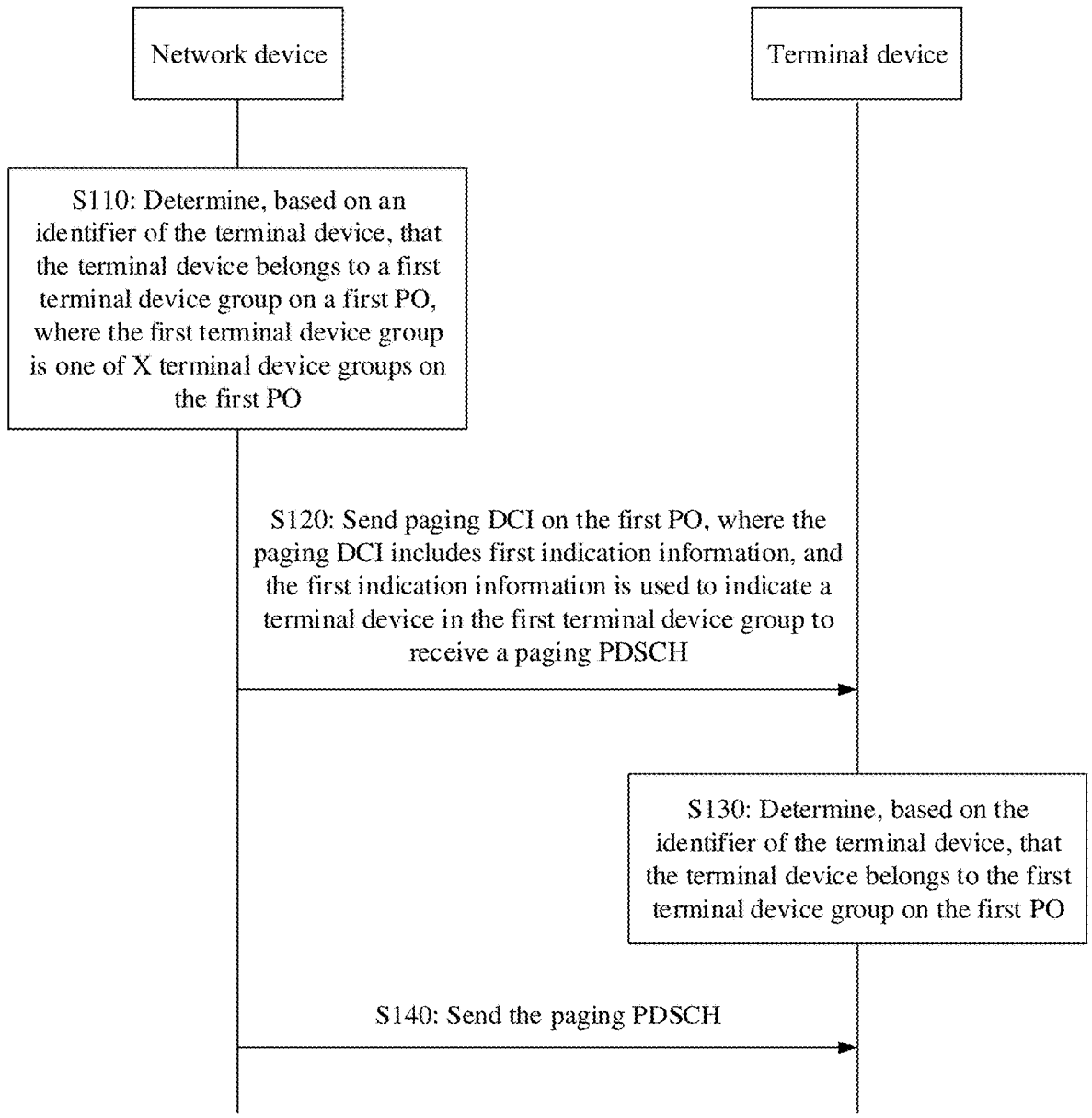
FIG. 3 is a schematic diagram of a communication method in accordance with some embodiments.

FIG. 3 is a schematic flowchart of a communication method in accordance with some embodiments. Steps shown in FIG. 3 are described below.

In S110, a network device determines, based on an identifier of a terminal device, that the terminal device belongs to a first terminal device group on a first PO. The first terminal device group is one of X terminal device groups on the first PO. Herein, the X terminal device groups on the first PO are groups into which terminal devices that receive paging DCI on the first PO are classified, and the first terminal device group is one of the groups. Classification is used for ease of description herein. The network device is unable to perform uniform grouping on the terminal devices, but separately determines a group of terminal devices that need to be paged. This is not limited.

There is a plurality of grouping manners for terminal devices. The plurality of grouping manners are separately described below.

Grouping Manners for Terminal Devices

Manner 1

The network device and the terminal device determine the first terminal device group based on a UE_ID of the terminal device, and the UE_ID and the first terminal device group meet a formula 4:

$x = \text{floor}(UE\_ID/N/Ns) \bmod X$ (Formula 4), where x is a number of the first terminal device group, x is an integer from 0 to X−1 (including 0 and X−1), floor indicates rounding down, N is a quantity of PFs included in a DRX cycle, Ns is a quantity of POs included in the PF, and mod indicates modulo.

In other words, terminal devices with a same value obtained after UE_IDs undergo processing of floor (UE_ID/N/Ns) mod X are allocated to a same terminal device group. For example, a UE_ID of a terminal device belonging to a terminal device group 0 meets floor (UE_ID/N/Ns) mod X=0.

Figure 4:
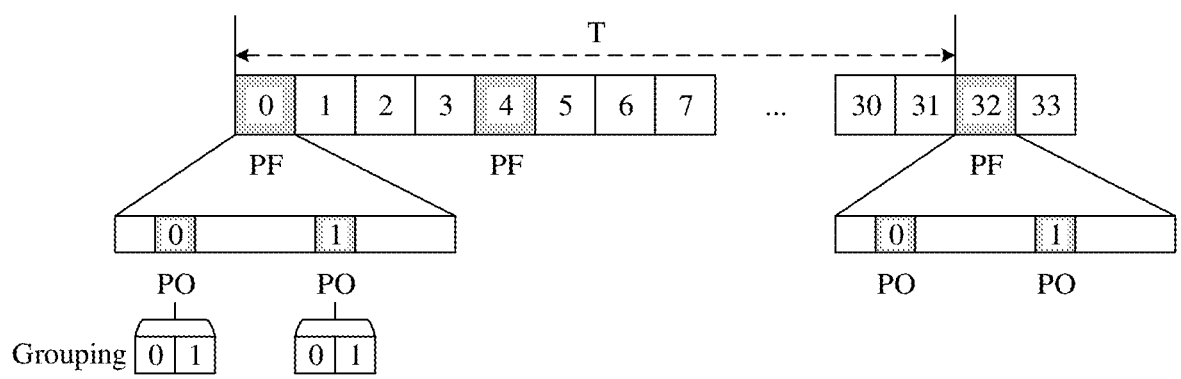
FIG. 4 is a schematic diagram of a grouping situation of terminal devices in accordance with some embodiments.

FIG. 4 shows a grouping situation of terminal devices when one DRX cycle includes 32 radio frames (in other words, T=32) and eight PFs (in other words, N=¼T=8), one PF includes two POs (in other words, Ns=2), and an offset of the PF is 0 (in other words, PF_offset=0).

As described above, if UE_IDs of terminal devices are separately 0, 8, 16, 24, and 32, the terminal devices correspond to the first PF (that is, a PF 0) in the DRX cycle, terminal devices whose UE_IDs are 0, 16, and 32 correspond to the first PO (that is, a PO 0) of the first PF, and terminal devices whose UE_IDs are 8 and 24 correspond to the second PO (that is, a PO 1) of the first PF. Values obtained after the UE_IDs undergo processing of floor (UE_ID/N/Ns) are respectively 0, 0, 1, 1, and 2, and values obtained after the values modulo 2 are 0, 0, 1, 1, and 0. Therefore, terminal devices whose UE_IDs are 0 and 32 correspond to the first PO of the first PF, and belong to the first terminal device group (a terminal device group 0); a terminal device whose UE_ID is 16 corresponds to the first PO of the first PF, and belongs to the second terminal device group (a terminal device group 1); a terminal device whose UE_ID is 8 corresponds to the second PO of the first PF, and belongs to the first terminal device group (the terminal device group 0); and a terminal device whose UE_ID is 24 corresponds to the second PO of the first PF, and belongs to the second terminal device group (the terminal device group 1).

Herein, the UE_ID still uses a solution in a current protocol; in other words, the UE_ID meets UE_ID=5G-S-TMSI mod 1024. In this case, the UE_ID is an integer from 0 to 1023. Therefore, X needs to meet X×N×Ns≤1024. Table 1 shows possible values of T, N, and Ns and a maximum value of X corresponding to these values when UE_ID=5G-S-TMSI mod 1024. When N=256 and Ns=4, each PO corresponds to one UE_ID. In this case, the terminal devices are unable to be grouped by using UE_IDs; in other words, X is equal to 1.

TABLE 1

| Value of T | Value of N | Value of Ns | Maximum value of X |
|---|---|---|---|
| 256 | T = 256 | 4 | 1 |
|  |  | 2 | 2 |
|  |  | 1 | 4 |
|  | ½T = 128 | 4 | 2 |
|  |  | 2 | 4 |
|  |  | 1 | 8 |
|  | ¼T = 64 | 4 | 4 |
|  |  | 2 | 8 |
|  |  | 1 | 16 |
|  | ⅛T = 32 | 4 | 8 |
|  |  | 2 | 16 |
|  |  | 1 | 32 |
|  | 1/16T = 16 | 4 | 16 |
|  |  | 2 | 32 |
|  |  | 1 | 64 |
| 128 | T = 128 | 4 | 2 |
|  |  | 2 | 4 |
|  |  | 1 | 8 |
|  | ½T = 64 | 4 | 4 |
|  |  | 2 | 8 |
|  |  | 1 | 16 |
|  | ¼T = 32 | 4 | 8 |
|  |  | 2 | 16 |
|  |  | 1 | 32 |

TABLE 1-continued

| Value of T | Value of N | Value of Ns | Maximum value of X |
|---|---|---|---|
|  | ⅛T = 16 | 4 | 16 |
|  |  | 2 | 32 |
|  |  | 1 | 64 |
|  | 1/16T = 8 | 4 | 32 |
|  |  | 2 | 64 |
|  |  | 1 | 128 |
| 64 | T = 64 | 4 | 4 |
|  |  | 2 | 8 |
|  |  | 1 | 16 |
|  | ½T = 32 | 4 | 8 |
|  |  | 2 | 16 |
|  |  | 1 | 32 |
|  | ¼T = 16 | 4 | 16 |
|  |  | 2 | 32 |
|  |  | 1 | 64 |
|  | ⅛T = 8 | 4 | 32 |
|  |  | 2 | 64 |
|  |  | 1 | 128 |
|  | 1/16T = 4 | 4 | 64 |
|  |  | 2 | 128 |
|  |  | 1 | 256 |
| 32 | T = 32 | 4 | 8 |
|  |  | 2 | 16 |
|  |  | 1 | 32 |
|  | ½T = 16 | 4 | 16 |
|  |  | 2 | 32 |
|  |  | 1 | 64 |
|  | ¼T = 8 | 4 | 32 |
|  |  | 2 | 64 |
|  |  | 1 | 128 |
|  | ⅛T = 4 | 4 | 64 |
|  |  | 2 | 128 |
|  |  | 1 | 256 |
|  | 1/16T = 2 | 4 | 128 |
|  |  | 2 | 256 |
|  |  | 1 | 512 |

If the UE_ID is redescribed and a range of the UE_ID is expanded, this problem is resolved. The UE_ID is described as meeting UE_ID=5G-S-TMSI mod (b×1024), where b is a positive integer greater than 1, or b is a positive integer power of 2. In this case, X needs to meet X×N×Ns≤b×1024. As a value of b increases, X is configured to have a larger maximum value. For example, if the UE_ID is described as 5G-S-TMSI mod 8192, when N=256 and Ns=4, the maximum value of X is 8.

In the manner 1, because a maximum possible value of a total quantity of UE_IDs of the terminal devices, the value of N, and the value of Ns are an integer power of 2, the UE_IDs of the terminal devices are randomly distributed, and when X is an integer power of 2, quantities of terminal devices included in the terminal device groups are relatively balanced. Therefore, as an example, X is limited to an integer power of 2.

Manner 2

The network device and the terminal device determine the first terminal device group based on a 5G-S-TMSI of the terminal device, and the 5G-S-TMSI and the first terminal device group meet a formula 5:

$$x=\text{floor}(5G\text{-}S\text{-}TMSI/N/Ns) \bmod X \qquad \text{(Formula 5)},$$

where x is a number of the first terminal device group, x is an integer from 0 to X−1 (including 0 and X−1), floor indicates rounding down, N is a quantity of paging frames PFs included in a discontinuous reception DRX cycle, Ns is a quantity of POs included in the PF, and mod indicates modulo.

In other words, terminal devices with a same value obtained after 5G-S-TMSIs undergo processing of floor (5G-S-TMSI/N/Ns) mod X are allocated to a same terminal device group. For example, a 5G-S-TMSI of a terminal device belonging to a terminal device group 0 meets floor (5G-S-TMSI/N/Ns) mod X=0.

FIG. 4 is still used as an example; to be specific, T=32, N=¼T=8, Ns=2, PF_offset=0, and X=2. If 5G-S-TMSIs of terminal devices are separately 1024, 8, 2064, 24, and 32, UE_IDs of the terminal devices are respectively 0, 8, 16, 24, and 32. the terminal devices correspond to the first PF (that is, a PF 0) in the DRX cycle, terminal devices whose UE_IDs are 0, 16, and 32 correspond to the first PO (that is, a PO 0) of the first PF, and terminal devices whose UE_IDs are 8 and 24 correspond to the second PO (that is, a PO 1) of the first PF. Values obtained after the 5G-S-TMSIs undergo processing of floor (5G-S-TMSI/N/Ns) are respectively 64, 0, 129, 1, and 2, and values obtained after the values modulo 2 are 0, 0, 1, 1, and 0. Therefore, terminal devices whose 5G-S-TMSIs are 1024 and 32 correspond to the first PO of the first PF, and belong to the first terminal device group (a terminal device group 0); a terminal device whose 5G-S-TMSI is 2064 corresponds to the first PO of the first PF, and belongs to the second terminal device group (a terminal device group 1); a terminal device whose 5G-S-TMSI is 8 corresponds to the second PO of the first PF, and belongs to the first terminal device group (the terminal device group 0); and a terminal device whose 5G-S-TMSI is 24 corresponds to the second PO of the first PF, and belongs to the second terminal device group (the terminal device group 1).

Manner 3

The network device and the terminal device determine the first terminal device group based on a 5G-S-TMSI of the terminal device, and the 5G-S-TMSI and the first terminal device group meet a formula 6:

$$x=5G\text{-}S\text{-}TMSI \bmod X \qquad \text{(Formula 6)},$$

where x is a number of the first terminal device group, x is an integer from 0 to X−1 (including 0 and X−1), and mod indicates modulo.

In other words, terminal devices with a same value obtained after identities 5G-S-TMSIs undergo processing of 5G-S-TMSI mod X are allocated to a same terminal device group. For example, a 5G-S-TMSI of a terminal device belonging to a terminal device group 0 meets 5G-S-TMSI mod X=0.

In the manner 3, in a process of being allocated to a PO, the 5G-S-TMSI of the terminal device undergoes modulo processing for N and modulo processing for Ns, and both N and Ns are integer powers of 2. Therefore, if X is an even number, if grouping is performed by performing modulo on X by directly using the 5G-S-TMSI, an effect is affected. Therefore, as an example, X is limited to an odd number.

For example, in FIG. 4, terminal devices belonging to a same PO are classified into three groups; in other words, T=32, N=¼T=8, Ns=2, PF_offset=0, and X=3. If 5G-S-TMSIs of terminal devices are separately 1024, 8, 2064, 24, and 32, UE_IDs of the terminal devices are respectively 0, 8, 16, 24, and 32. the terminal devices correspond to the first PF (that is, a PF 0) in the DRX cycle, terminal devices whose UE_IDs are 0, 16, and 32 correspond to the first PO (that is, a PO 0) of the first PF, and terminal devices whose UE_IDs are 8 and 24 correspond to the second PO (that is, a PO 1) of the first PF. Values obtained after the 5G-S-TMSIs modulo 3 are 1, 2, 0, 0, and 2. Therefore, a terminal device whose 5G-S-TMSI is 1024 corresponds to the first PO of the first PF, and belongs to the second terminal device group (a terminal device group 1); a terminal device whose 5G-S-

TMSI is 2064 corresponds to the first PO of the first PF, and belongs to the first terminal device group (the terminal device group 0); a terminal device whose 5G-S-TMSI is 32 corresponds to the first PO of the first PF, and belongs to the third terminal device group (a terminal device group 2); a terminal device whose 5G-S-TMSI is 8 corresponds to the second PO of the first PF, and belongs to the third terminal device group (the terminal device group 2); and a terminal device whose 5G-S-TMSI is 24 corresponds to the second PO of the first PF, and belongs to the first terminal device group (the terminal device group 0).

In S120, the paging DCI is sent on the first PO. The paging DCI includes first indication information. The first indication information is used to indicate a terminal device in the first terminal device group to receive a paging PDSCH.

The paging DCI is DCI used for paging scheduling, and is a system information block type 1 (DCI format 1_0) scrambled by a P-RNTI and used for paging scheduling. The DCI format 1_0 includes a short message indicator (short message indicator) of two bits. As shown in Table 2, the short message indicator is used to indicate whether the DCI format 1_0 is used for paging scheduling.

TABLE 2

| Bit field | Short message indicator |
|---|---|
| 00 | Reserved |
| 01 | scheduling information for paging is present in the DCI |
| 10 | scheduling information for short message is present in the DCI |
| 11 | Both scheduling information for and scheduling information for short message are present in the DCI |

Last six bits in the DCI format 1_0 are reserved bits. Last six bits in a short message field are reserved bits. In addition, when the paging DCI does not include the scheduling information for short message, a remaining bit in the short message field further is used to carry other information. these bits is used to carry the first indication information.

The first indication information is in a plurality of forms. The plurality of forms are separately described below.
Forms of the First Indication Information
Manner 1
The first indication information is a bitmap of X bits. The X bits are in a one-to-one correspondence with the X terminal device groups, and each bit is used to indicate whether a terminal device in a corresponding terminal device group receives the paging PDSCH. For example, a bit "1" indicates that the terminal device in the corresponding terminal device group receives the paging PDSCH, and a bit "0" indicates that the terminal device in the corresponding terminal device group does not receive the paging PDSCH.

For example, when X=2, the first indication information is a bitmap of two bits. As shown in Table 3, the first bit in the first indication information is used to indicate whether a terminal device in a terminal device group 0 receives the paging PDSCH, and the second bit in the first indication information is used to indicate whether a terminal device in a terminal device group 1 receives the paging PDSCH. If a terminal device in any terminal device group does not need to be indicated to receive the paging PDSCH, the terminal device is equivalent to that the paging DCI that includes the scheduling information for paging does not need to be sent on the first PO, and the network device does not need to send the first indication information.

TABLE 3

| Bit field | First indication information |
|---|---|
| 00 | Reserved |
| 01 | A terminal device in a terminal device group 0 does not receive the paging PDSCH<br>A terminal device in a terminal device group 1 receives the paging PDSCH |
| 10 | A terminal device in a terminal device group 0 receives the paging PDSCH<br>A terminal device in a terminal device group 1 does not receive the paging PDSCH |
| 11 | A terminal device in a terminal device group 0 receives the paging PDSCH<br>A terminal device in a terminal device group 1 receives the paging PDSCH |

In the manner 1, to ensure that each terminal device group is indicated, X needs to be less than or equal to a quantity of bits that are in the paging DCI and that is used to carry the first indication information. In other words, a value of X is adjustable based on the quantity of bits that are in the paging DCI and that is used to carry the first indication information.

Based on the manner 1, the network device separately indicates whether a terminal device in each terminal device group receives the paging PDSCH. When a frequency in which the terminal device is paged is relatively high, that is, when a probability that there is a paged terminal device in a plurality of terminal device groups belonging to a same PO is relatively high, this manner reduces a false alarm probability of the terminal device.
Manner 2

The first indication information is Y bits. There are $2^Y$ available indication states. the indication states is used to indicate whether the terminal device in the terminal device group receives the PDSCH, or some of the indication states is used to indicate whether the terminal device in the terminal device group receives the PDSCH. Other indication states is unable to be used, or is used for another purpose. This is not limited.

Actually used indication states in the $2^Y$ available indication states are described below.

In the actually used indication states, one indication state is used to indicate a terminal device in the X terminal device groups to receive the paging PDSCH.

In addition, in the actually used indication states, each of X indication states is used to indicate a terminal device in one of the X terminal device groups to receive the paging PDSCH. Herein, the X indication states are in a one-to-one correspondence with the X terminal device groups.

The actually used indication states is understood as that different indication states of the first indication information are used to indicate terminal devices in terminal device groups or in a single terminal device group to receive the paging PDSCH. One indication state is allocated to a terminal device group combination including the terminal device groups. In addition, one indication state is allocated to each terminal device group.

For example, when X=3, the first indication information is two bits, and there are $2^2=4$ available indication states. As shown in Table 4, indication states "00", "01", and "10" of the first indication information are used to indicate a terminal device in a single terminal device group to receive the paging PDSCH, and an indication state "11" of the first indication information is used to indicate terminal devices in terminal device groups to receive the paging PDSCH.

TABLE 4

| Bit field | First indication information |
|---|---|
| 00 | A terminal device in a terminal device group 0 receives the paging PDSCH |
| 01 | A terminal device in a terminal device group 1 receives the paging PDSCH |
| 10 | A terminal device in a terminal device group 2 receives the paging PDSCH |
| 11 | Terminal devices in terminal device groups receive the paging PDSCH |

For another example, when X=4, the first indication information is three bits, and there are $2^3$=available indication states. As shown in Table 5, indication states "000", "001", "010", and "011" of the first indication information are used to indicate a terminal device in a single terminal device group to receive the paging PDSCH, an indication state "100" of the first indication information is used to indicate terminal devices in terminal device groups to receive the paging PDSCH, and indication states "101", "110", and "111" of the first indication information are not used.

TABLE 5

| Bit field | First indication information |
|---|---|
| 000 | A terminal device in a terminal device group 0 receives the paging PDSCH |
| 001 | A terminal device in a terminal device group 1 receives the paging PDSCH |
| 010 | A terminal device in a terminal device group 2 receives the paging PDSCH |
| 011 | A terminal device in a terminal device group 3 receives the paging PDSCH |
| 100 | Terminal devices in terminal device groups receive the paging PDSCH |
| 101 | Not used |
| 110 | Not used |
| 111 | Not used |

In the manner 2, to ensure that each terminal device group is separately indicated, X+1 indication states need to be used. Therefore, Y needs to meet Y=ceil($\log_2$(X+1)), where ceil indicates rounding up (that is, rounding in a positive infinity direction). In addition, Y needs to be less than or equal to a quantity of bits that are in the paging DCI and that is used to carry the first indication information. In other words, a value of X is adjustable based on the quantity of bits that are in the paging DCI and that is used to carry the first indication information.

In addition, from Table 4 and Table 5 that when X is $2^Y-1$, indication states of the Y bits are used, so that the bits are fully used. Therefore, as an example, X is limited to a positive integer power of 2 minus 1.

Based on the manner 2, if a paged terminal device exists in one terminal device group, the network device indicates the terminal device group, and if the paged terminal device exists in more than one terminal device group, the network device indicates terminal device groups. In the manner 1, the first indication information needs to occupy X bits. In the manner 2, the first indication information needs to occupy ceil($\log_2$(X+1)) bits. When X is less than or equal to 2, a quantity of bits that need to be occupied by the first indication information in the manner 1 and a quantity of bits that need to be occupied by the first indication information in the manner 2 are equal. When X is greater than 2, the quantity of bits that need to be occupied by the first indication information in the manner 2 is less than the quantity of bits that need to be occupied by the first indication information in the manner 1. Therefore, based on the manner 2, bits is saved. In addition, a same quantity of bits supports a larger quantity of terminal device groups, so that more refined terminal device groups are supported. When a frequency in which the terminal device is paged is relatively low, that is, when a probability that there is the paged terminal device in a plurality of terminal device groups belonging to a same PO is relatively low, this manner reduces a false alarm probability of the terminal device.

Manner 3

The first indication information is Y bits. There are $2^Y$ available indication states. the indication states is used to indicate whether the terminal device in the terminal device group receives the PDSCH, or some of the indication states is used to indicate whether the terminal device in the terminal device group receives the PDSCH. Other indication states is unable to be used, or is used for another purpose. This is not limited.

Actually used indication states in the $2^Y$ available indication states are described below.

In the actually used indication states, one indication state is used to indicate a terminal device in the X terminal device groups to receive the paging PDSCH.

In addition, in the used indication states, each of at least one indication state is used to indicate a terminal device in some terminal device groups in the X terminal device groups to receive the paging PDSCH. Herein, some terminal device groups are at least two terminal device groups. When a terminal device group corresponding to any indication state is compared with a terminal device group corresponding to any other indication state, at least one terminal device group is different. In some embodiments, when X is equal to 2, no such indication state is used. In this case, the manner 3 is equivalent to the manner 2.

In addition, in the used indication states, each of X indication states is used to indicate a terminal device in one of the X terminal device groups to receive the paging PDSCH. Herein, the X indication states are in a one-to-one correspondence with the X terminal device groups.

The actually used indication states is understood as that different indication states of the first indication information are used to indicate terminal devices in terminal device groups or in a single terminal device group to receive the paging PDSCH, as shown in the manner 2, and further is used to indicate a terminal device in some terminal device groups to receive the paging PDSCH. One indication state is allocated to a terminal device group combination including the terminal device groups. One indication state is allocated to each terminal device group. In addition, indication states are allocated to some or all other combinations of the terminal device groups. To save indication states, one indication state is allocated to any combination of the terminal device groups.

For example, in Table 5, the indication states "101", "110", and "111" are not used. Based on the manner 3, the indication states is used to indicate a terminal device in some terminal device groups to receive the paging PDSCH. For example, the indication state "101" of the first indication information is used to indicate terminal devices in the terminal device group 0 and the terminal device group 1 to receive the PDSCH, the indication state "110" of the first indication information is used to indicate terminal devices in the terminal device group 2 and the terminal device group 3 to receive the PDSCH, and the indication state "111" of the first indication information is used to indicate terminal devices in the terminal device group 0 and the terminal device group 2 to receive the PDSCH. Alternatively, bits of the first indication information is extended, and an available indication state is added, so that the indication state is allocated to any combination of the terminal device groups. More indication states that indicates the terminal device groups lead to a lower false alarm probability of the terminal device, but more bits need to be occupied.

In the manner 3, to ensure that each terminal device group is separately indicated, more than X+1 indication states need to be used. Therefore, Y needs to meet ceil($\log_2(X+1)$) ≤Y≤X, where ceil indicates rounding up. In addition, Y needs to be less than or equal to a quantity of bits that are in the paging DCI and that is used to carry the first indication information. In other words, a value of X is adjustable based on the quantity of bits that are in the paging DCI and that is used to carry the first indication information.

Based on the manner 3, if a paged terminal device exists in one terminal device group, the network device indicates the terminal device group, and if the paged terminal device exists in more than one terminal device group, the network device indicates a minimum terminal device group combination including the terminal device groups. In the manner 1, the first indication information needs to occupy X bits. In the manner 3, the first indication information needs to occupy Y bits, where ceil(log2(X+1))≤Y≤X. When X is less than or equal to 2, a quantity of bits that need to be occupied by the first indication information in the manner 1 and a quantity of bits that need to be occupied by the first indication information in the manner 3 are equal. When X is greater than 2, the quantity of bits that need to be occupied by the first indication information in the manner 3 is less than the quantity of bits that need to be occupied by the first indication information in the manner 1. Therefore, based on the manner 3, bits is saved. In addition, a same quantity of bits supports a larger quantity of terminal device groups, so that more refined terminal device groups are supported. When a frequency in which the terminal device is paged is relatively low, that is, when a probability that there is the paged terminal device in a plurality of terminal device groups belonging to a same PO is relatively low, this manner reduces a false alarm probability of the terminal device. In addition, when the paged terminal device exists in more than one terminal device group, the network device indicates a minimum terminal device group combination including the terminal device groups, instead of directly indicating the terminal device groups as shown in the manner 2. Therefore, the manner 3 has flexibility, and a false alarm probability of the terminal device is further reduced.

Manner 4

The first indication information is Y bits. There are $2^Y$ available indication states. the indication states are used to indicate whether the terminal device in the terminal device group receives the PDSCH, or some of the indication states are used to indicate whether the terminal device in the terminal device group receives the PDSCH. Other indication states is unable to be used, or are used for another purpose. This is not limited.

In the manner 4, X meets $X=2^K$, where K is a positive integer. Because a maximum possible value of a total quantity of UE_IDs of the terminal devices, the value of N, and the value of Ns are an integer power of 2, the UE_IDs of the terminal devices are randomly distributed, and when X is an integer power of 2, quantities of terminal devices included in the terminal device groups are relatively balanced.

Actually used indication states in the $2^Y$ available indication states are described below.

In the actually used indication states, one indication state is used to indicate a terminal device in the X terminal device groups to receive the paging PDSCH.

In addition, in the actually used indication states, each of $X/(2^M)$ indication states is used to indicate a terminal device in $2^M$ terminal device groups in the X terminal device groups to receive the paging PDSCH, where M is an integer from 0 to K−1. Herein, in indication states corresponding to a same quantity of terminal device groups, there are no same terminal device groups in a terminal device group corresponding to any indication state and a terminal device group corresponding to any other indication state.

In some embodiments, the manner 4 is a special form of the manner 3 for the actually used indication states. In the manner 4, indication states are allocated to terminal device groups and a combination of the terminal device groups based on a tree structure. A set including the terminal device groups, a set including half of the terminal device groups, a set including a quarter of the terminal device groups, and the like are constructed based on the tree structure, until a smallest set includes one terminal device group, and one indication state is allocated to each set.

Based on this idea, in another description manner, the actually used indication states in the $2^Y$ available indication states are described again.

In the actually used indication states, one indication state is used to indicate the terminal device groups, that is, a highest layer of the tree structure.

In addition, in the actually used indication states, each of X indication states is used to indicate a terminal device in one of the X terminal device groups to receive the paging PDSCH. Herein, the X indication states are in a one-to-one correspondence with the X terminal device groups, that is, the lowest layer of the tree structure.

In addition, when $X≥2^2$, in the actually used indication states, each of two indication states is used to indicate a terminal device in X/2 terminal device groups in the X terminal device groups to receive the paging PDSCH. Herein, in some embodiments, the X terminal device groups are classified into two sets, each set includes X/2 terminal device groups, and the two indication states are in a one-to-one correspondence with the two sets, that is, the second layer of the tree structure.

In addition, when $X≥2^3$, in the used indication states, each of four indication states is used to indicate a terminal device in X/4 terminal device groups in the X terminal device groups to receive the paging PDSCH. Herein, in some embodiments, the X terminal device groups are classified into four sets, each set includes X/4 terminal device groups, and the four indication states are in a one-to-one correspondence with the four sets, that is, the third layer of the tree structure.

The rest is deduced in a similar manner until such $1+2^1+2^2+\ldots+2^K$ indication states exist.

For example, when X=8, the first indication information is four bits, and there are $2^4=16$ available indication states. As shown in Table 6, indication states "0000", "0001", "0010", "0011", "0100", "0101", "0110", and "0111" of the first indication information are used to indicate a terminal device in a single terminal device group to receive the paging PDSCH, indication states "1000", "1001", "1010", and "1011" of the first indication information are used to indicate terminal devices in two terminal device groups to receive the paging PDSCH, indication states "1100" and "1101" of the first indication information are used to indicate terminal devices in four terminal device groups to receive the paging PDSCH, an indication state "1110" of the first indication information is used to indicate terminal devices in the terminal device groups to receive the paging PDSCH, and an indication state "1111" of the first indication information is not used.

minimum terminal device group combination including the terminal device groups, instead of directly indicating the terminal device groups as shown in the manner 2. Therefore, the manner 4 has flexibility, and a false alarm probability of the terminal device is further reduced. In addition, compared with a combination form of some other terminal device

TABLE 6

| Bit field | First indication information |
|---|---|
| 0000 | A terminal device in a terminal device group 0 receives the paging PDSCH |
| 0001 | A terminal device in a terminal device group 1 receives the paging PDSCH |
| 0010 | A terminal device in a terminal device group 2 receives the paging PDSCH |
| 0011 | A terminal device in a terminal device group 3 receives the paging PDSCH |
| 0100 | A terminal device in a terminal device group 4 receives the paging PDSCH |
| 0101 | A terminal device in a terminal device group 5 receives the paging PDSCH |
| 0110 | A terminal device in a terminal device group 6 receives the paging PDSCH |
| 0111 | A terminal device in a terminal device group 7 receives the paging PDSCH |
| 1000 | Terminal devices in a terminal device group 0 and a terminal device group 1 receive the paging PDSCH |
| 1001 | Terminal devices in a terminal device group 2 and a terminal device group 3 receive the paging PDSCH |
| 1010 | Terminal devices in a terminal device group 4 and a terminal device group 5 receive the paging PDSCH |
| 1011 | Terminal devices in a terminal device group 6 and a terminal device group 7 receive the paging PDSCH |
| 1100 | Terminal devices in a terminal device group 0, a terminal device group 1, a terminal device group 2, and a terminal device group 3 receive the paging PDSCH |
| 1101 | Terminal devices in a terminal device group 4, a terminal device group 5, a terminal device group 6, and a terminal device group 7 receive the paging PDSCH |
| 1110 | Terminal devices in terminal device groups receive the paging PDSCH |
| 1111 | Not used |

In the manner 4, to ensure that each quantity of terminal device groups in the tree structure is indicated, $1+2^1+2^2+\ldots+2^K$ indication states need to be used. Therefore, Y needs to meet $Y=1+\log_2 X$. In addition, Y needs to be less than or equal to a quantity of bits that are in the paging DCI and that is used to carry the first indication information. In other words, a value of X is adjustable based on the quantity of bits that are in the paging DCI and that is used to carry the first indication information.

Based on the manner 4, if a paged terminal device exists in one terminal device group, the network device indicates the terminal device group, and if the paged terminal device exists in more than one terminal device group, the network device indicates a minimum terminal device group combination including the terminal device groups. In the manner 1, the first indication information needs to occupy X bits. In the manner 4, the first indication information needs to occupy $1+\log_2 X$ bits. When X is less than or equal to 2, a quantity of bits that need to be occupied by the first indication information in the manner 1 and a quantity of bits that need to be occupied by the first indication information in the manner 4 are equal. When X is greater than 2, the quantity of bits that need to be occupied by the first indication information in the manner 4 is less than the quantity of bits that need to be occupied by the first indication information in the manner 1. Therefore, based on the manner 4, bits are saved. In addition, a same quantity of bits supports a larger quantity of terminal device groups, so that more refined terminal device groups are supported. When a frequency in which the terminal device is paged is relatively low, that is, when a probability that there is the paged terminal device in a plurality of terminal device groups belonging to a same PO is relatively low, this manner reduces a false alarm probability of the terminal device. In addition, when the paged terminal device exists in more than one terminal device group, the network device indicates a groups that exists in the manner 3, the tree structure is relatively balanced, a false alarm probability of the terminal device is reduced, and a quantity of occupied bits further is taken into consideration.

As shown in Table 6, when the tree structure is used, one indication state is not used. The indication state is reserved, or an additional combination of some terminal device groups are indicated based on a predetermined rule by using the indication state, to fully use the indication state and reduce a false alarm probability of the terminal device. Alternatively, indication states corresponding to some terminal device group combinations are reduced based on a predetermined rule, to save one bit. For example, 1111 is used to indicate the terminal devices in the terminal device group 0 and the terminal device group 7 to receive the paging PDSCH, or is used to indicate the terminal devices in the terminal device group 2, the terminal device group 3, the terminal device group 4, and the terminal device group 5 to receive the paging PDSCH, so that indication states are used.

In addition, if a quantity of bits that are in the paging DCI and that is used to carry the first indication information is greater than $1+\log_2 X$ and less than X, a combination of some terminal device groups are added based on the tree structure and a predetermined rule, to reduce a false alarm probability of the terminal device.

In some manners of "forms of the first indication information", X is described as an integer greater than 2, and this is not contrary to a fact that the value of X is 1. When X is equal to 1, terminal devices corresponding to a same PO belong to a same terminal device group; in other words, the terminal devices corresponding to the PO do not need to be grouped. In this case, the network device sends the first indication information without using the paging DCI, and the terminal devices corresponding to the PO receive the paging PDSCH.

In S130, the terminal device determines, based on the identifier of the terminal device, that the terminal device belongs to the first terminal device group on the first PO. The first terminal device group is one of the X terminal device groups on the first PO. Herein, for a manner in which the terminal device determines the first terminal device group, refer to the manner in which the network device determines the first terminal device group in S110. Details are not described again. Certainly, a process in which the network device determines a quantity of terminal device groups is not applicable to the terminal device. For example, the network device adjusts the value of X based on the quantity of bits that are in the paging DCI and that is used to carry the first indication information. Correspondingly, the terminal device determines the value of X according to an indication of the network device.

There is a plurality of configuration manners for the quantity of terminal device groups. The plurality of configuration manners are separately described below.

Configuration Manners of the Quantity of Terminal Device Groups

Manner 1

The value of X is predetermined, and both the network device and the terminal device use the value.

Alternatively, a preset value of X is predetermined, and both the network device and the terminal device determine the value of X based on the preset value and a maximum value of X. If the preset value is less than or equal to the maximum value, the preset value is used as the value of X. If the preset value is greater than the maximum value, the maximum value is used as the value of X.

For example, the preset value of X is 8. When N=64 and Ns=4, as shown in Table 1, the maximum value of X is 4, and in this case, the value of X is 4. When N=64 and Ns=2, as shown in Table 1, the maximum value of X is 8, and in this case, the value of X is 8. When N=64 and Ns=1, as shown in Table 1, the maximum value of X is 16, and in this case, the value of X is 8.

Herein, X is configured to have a plurality of preset values. If the preset values are greater than the maximum value, the maximum value is used as the value of X. If a preset value that is less than or equal to the maximum value exists in the preset values, a maximum preset value that is less than or equal to the maximum value in the preset values are used as the value of X. Alternatively, the preset values are set as follows: a preset value that is less than or equal to the maximum value exists. In this case, a maximum preset value that is less than or equal to the maximum value in the preset values are used as the value of X.

For example, the preset values of X are 1, 2, 4, and 8. When N=128 and Ns=4, as shown in Table 1, the maximum value of X is 2, and in this case, the value of X is 2. When N=128 and Ns=2, as shown in Table 1, the maximum value of X is 4, and in this case, the value of X is 4. When N=128 and Ns=1, as shown in Table 1, the maximum value of X is 8, and in this case, the value of X is 8.

In this manner, the network device does not need to notify the terminal device of the value of X, so that signaling is reduced.

Manner 2

The network device sends the value of X to the terminal device by using a system information block type 1 (SIB1), a system message, or higher layer signaling. The terminal device directly uses the value.

Alternatively, a plurality of preset values of X is predetermined. The network device indicates, to the terminal device by using a SIB 1, a system message, or higher layer signaling, which of the preset values is the value of X. The terminal device determines the value of X from the preset values according to an indication of the network device.

For example, preset values of X are 1, 2, 4, and 8, and the network device separately indicates that the value of X is 1, 2, 4, and 8 by using indexes 0, 1, 2, and 3.

In this manner, the network device adjusts the value of X based on a situation.

Manner 3

A plurality of preset values of X is predetermined. Alternatively, the network device sends a plurality of preset values of X to the terminal device by using a SIB 1, a system message, or higher layer signaling. Then, the network device indicates, to the terminal device by using the paging DCI, which of the preset values is the value of X. The terminal device determines the value of X from the preset values according to an indication of the network device.

For example, the preset values of X are 1, 2, 4, and 8. The network device indicates the value of X by using two bits in last six bits in the paging DCI, and a bit field "00", a bit field "01", a bit field "10", and a bit field "11" are respectively used to indicate that the value of X is 1, 2, 4, and 8. When the first indication information is a bitmap (that is, "manner 1" in "forms of the first indication information" is used), as shown in Table 7, when X=1, the paging DCI does not need to include the first indication information, and is used to indicate that a bit of X is occupied. When X=2, the first indication information is two bits, and further needs to occupy other two bits in the last six bits in the paging DCI. When X=4, the first indication information is four bits, and further needs to occupy remaining four bits in the last six bits in the paging DCI. When X=8, the first indication information is eight bits, and in addition to occupying the remaining four bits in the last six bits in the paging DCI, the first indication information further needs to occupy four bits in the last six bits in the paging DCI.

TABLE 7

| Bit field indicating X | Value of X | Location of the first indication information |
| --- | --- | --- |
| 00 | 1 | Not Applicable |
| 01 | 2 | Two bits in last six bits in the paging DCI |
| 10 | 4 | Four bits in last six bits in the paging DCI |
| 11 | 8 | Four bits in last six bits in the paging DCI and four bits in last six bits in a short message in the paging DCI |

In this manner, the network device flexibly adjusts the value of X. For example, if there are a relatively large quantity of bits that is used to carry the first indication information in the paging DCI, the network device selects a relatively large preset value as the value of X; and if there are a relatively small quantity of bits that is used to carry the first indication information in the paging DCI, the network device selects a relatively small preset value as the value of X. For another example, in some cases, if terminal devices are grouped, a terminal device that needs to be paged exists in terminal device groups. In this case, the network device adjusts X to 1; in other words, the terminal devices are not grouped, to reduce bits used to carry the first indication information.

In some embodiments, although S130 is after S120 in FIG. 3, at least in "manner 1" and "manner 2" in "configuration manners of the quantity of terminal device groups", a sequence of S120 and S130 is not limited thereto. The terminal device determines, before receiving the paging DCI, a group to which the terminal device belongs, or determines, after receiving the paging DCI, a group to which the terminal device belongs. The two processes alternatively are performed in parallel. In "manner 3" in "configuration manners of the quantity of terminal device groups", because the value of X is dynamically indicated in the paging DCI, the terminal device needs to learn a quantity of terminal device groups after receiving the paging DCI, and a group of the terminal device is determined accordingly.

In S140, the network device sends the paging PDSCH to the terminal device. Correspondingly, the terminal device receives the paging PDSCH based on the paging DCI. Herein, the paging PDSCH is a PDSCH that is scheduled by the paging DCI and that is used to carry a paging record of the terminal device. The paging record is a paging record list in a current protocol, or is other information that indicates a terminal device to be paged. This is not limited.

In some embodiments is properly combined and used, and explanations or descriptions of terms appearing in embodiments are mutually referenced or interpreted in the embodiments. This is not limited herein.

In some embodiments, a sequence number of the foregoing processes does not mean a sequence of execution. The sequence of execution of the processes needs to be determined based on functions and internal logic of the processes. Various numeric numbers or sequence numbers involved in the foregoing processes are described for convenient division and should not constitute any limitation on an implementation process of some embodiments.

In the foregoing described method embodiment, the network device and the terminal device are used as examples of execution entities. The network device alternatively is replaced with a chip configured in the network device, and the terminal device alternatively is replaced with a chip configured in the terminal device.

The method provided in some embodiments is described above with reference to FIG. 3. An apparatus provided in some embodiments is described in detail below with reference to FIG. 5 to FIG. 7.

Figure 5:
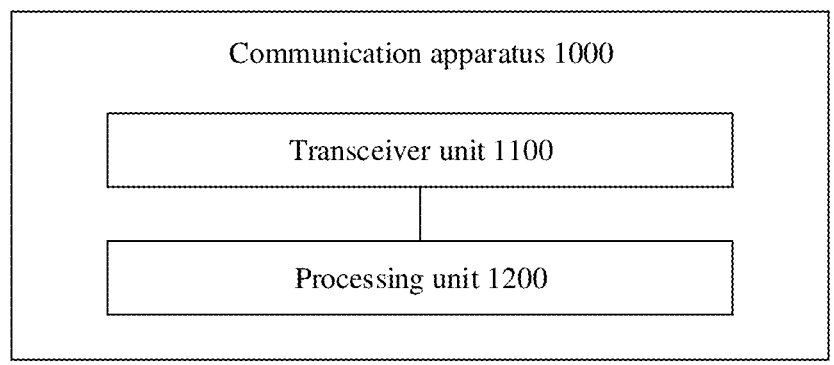
FIG. 5 is a schematic diagram of a structure of a communication apparatus in accordance with some embodiments.

FIG. 5 is a schematic block diagram of a communication apparatus in accordance with some embodiments. As shown in FIG. 5, a communication apparatus 1000 includes a transceiver unit 1100 and a processing unit 1200.

In an embodiment, the communication apparatus 1000 may correspond to the network device in the method provided in some embodiments. The communication apparatus 1000 is a network device or a chip configured in the network device, and units in the communication apparatus 1000 are separately configured to implement an operation performed by the network device in a corresponding method.

The processing unit 1200 is configured to determine, based on an identifier of a terminal device, that the terminal device belongs to a first terminal device group on a first PO, where the first terminal device group is one of X terminal device groups on the first PO.

The transceiver unit 1100 is configured to send paging DCI on the first PO, where the paging DCI includes first indication information, and the first indication information is used to indicate a terminal device in the first terminal device group to receive a paging PDSCH.

The transceiver unit 1100 is further configured to send the paging PDSCH to the terminal device.

Optionally, the identifier of the terminal device is a UE_ID, and the UE_ID and the first terminal device group meet x=floor(UE_ID/N/Ns) mod X, where x is a number of the first terminal device group, x is an integer from 0 to X−1 (including 0 and X−1), floor indicates rounding down, N is a quantity of PFs included in a DRX cycle, Ns is a quantity of POs included in the PF, and mod indicates modulo. The UE_ID and a 5G-S-TMSI of the terminal device meet UE_ID=5G-S-TMSI mod 1024, and X meets X×N×Ns≤1024. Alternatively, the UE_ID and a 5G-S-TMSI of the terminal device meet UE_ID=5G-S-TMSI mod (b×1024), and X meets X×N×Ns≤1024×b. As an example, b is a positive integer greater than 1. As another example, b is a positive integer power of 2. As an example, X is an integer power of 2.

Optionally, the identifier of the terminal device is a 5G-S-TMSI, and the 5G-S-TMSI and the first terminal device group meet x=floor(5G-S-TMSI/N/Ns) mod X, where x is a number of the first terminal device group, x is an integer from 0 to X−1 (including 0 and X−1), floor indicates rounding down, N is a quantity of PFs included in a DRX cycle, Ns is a quantity of POs included in the PF, and mod indicates modulo.

Optionally, the identifier of the terminal device is a 5G-S-TMSI, and the 5G-S-TMSI and the first terminal device group meet x=5G-S-TMSI mod X, where x is a number of the first terminal device group, x is an integer from 0 to X−1 (including 0 and X−1), and mod indicates modulo. As an example, X is an odd number.

Optionally, the first indication information is Y bits, Y meets Y=1+log$_2$X, and X meets X=2$^K$, where K is a positive integer. One indication state of the first indication information is used to indicate a terminal device in the X terminal device groups to receive the paging PDSCH. Each of X/(2$^M$) indication states of the first indication information is used to indicate a terminal device in 2$^M$ terminal device groups in the X terminal device groups to receive the paging PDSCH, where M is an integer from 0 to K−1.

Optionally, the first indication information is Y bits, and Y meets ceil(log$_2$(X+1))≤Y≤X, where ceil indicates rounding up. One indication state of the first indication information is used to indicate a terminal device in the X terminal device groups to receive the paging PDSCH. Each of at least one indication state of the first indication information is used to indicate a terminal device in some terminal device groups in the X terminal device groups to receive the paging PDSCH, and the some terminal device groups are at least two terminal device groups. Each of X indication states of the first indication information is used to indicate a terminal device in one of the X terminal device groups to receive the paging PDSCH.

Optionally, the first indication information is Y bits, and Y meets Y=ceil(log$_2$(X+1)), where ceil indicates rounding up. One indication state of the first indication information is used to indicate a terminal device in the X terminal device groups to receive the paging PDSCH. Each of X indication states of the first indication information is used to indicate a terminal device in one of the X terminal device groups to receive the paging PDSCH.

Optionally, the first indication information is a bitmap of X bits, the X bits are in a one-to-one correspondence with the X terminal device groups, and each of the X bits is used to indicate whether a terminal device in a corresponding terminal device group receives the paging PDSCH.

In another embodiment, the communication apparatus 1000 may correspond to the terminal device in the method provided in some embodiments. The communication apparatus 1000 is a terminal device or a chip configured in the terminal device, and units in the communication apparatus 1000 are separately configured to implement an operation performed by the terminal device in a corresponding method.

The processing unit 1200 is configured to determine, based on an identifier of a terminal device, that the terminal device belongs to a first terminal device group on a first PO, where the first terminal device group is one of X terminal device groups on the first PO.

The transceiver unit 1100 is configured to receive paging DCI on the first PO, where the paging DCI includes first indication information, and the first indication information is used to indicate a terminal device in the first terminal device group to receive a paging PDSCH.

The transceiver unit 1100 is further configured to receive the paging PDSCH based on the paging DCI.

Optionally, the identifier of the terminal device is a UE_ID, and the UE_ID and the first terminal device group meet x=floor(UE_ID/N/Ns) mod X, where x is a number of the first terminal device group, x is an integer from 0 to X−1 (including 0 and X−1), floor indicates rounding down, N is a quantity of PFs included in a DRX cycle, Ns is a quantity of POs included in the PF, and mod indicates modulo. The UE_ID and a 5G-S-TMSI of the terminal device meet UE_ID=5G-S-TMSI mod 1024, and X meets X×N×Ns≤1024. Alternatively, the UE_ID and a 5G-S-TMSI of the terminal device meet UE_ID=5G-S-TMSI mod (b×1024), and X meets X×N×Ns≤1024×b. As an example, b is a positive integer greater than 1. As another example, b is a positive integer power of 2. As an example, X is an integer power of 2.

Optionally, the identifier of the terminal device is a 5G-S-TMSI, and the 5G-S-TMSI and the first terminal device group meet x=floor(5G-S-TMSI/N/Ns) mod X, where x is a number of the first terminal device group, x is an integer from 0 to X−1 (including 0 and X−1), floor indicates rounding down, N is a quantity of PFs included in a DRX cycle, Ns is a quantity of POs included in the PF, and mod indicates modulo.

Optionally, the identifier of the terminal device is a 5G-S-TMSI, and the 5G-S-TMSI and the first terminal device group meet x=5G-S-TMSI mod X, where x is a number of the first terminal device group, x is an integer from 0 to X−1 (including 0 and X−1), and mod indicates modulo. As an example, X is an odd number.

Optionally, the first indication information is Y bits, Y meets Y=1+log$_2$X, and X meets X=2$^K$, where K is a positive integer. One indication state of the first indication information is used to indicate a terminal device in the X terminal device groups to receive the paging PDSCH. Each of X/(2$^M$) indication states of the first indication information is used to indicate a terminal device in 2$^M$ terminal device groups in the X terminal device groups to receive the paging PDSCH, where M is an integer from 0 to K−1.

Optionally, the first indication information is Y bits, and Y meets ceil(log$_2$(X+1))≤Y≤X, where ceil indicates rounding up. One indication state of the first indication information is used to indicate a terminal device in the X terminal device groups to receive the paging PDSCH. Each of at least one indication state of the first indication information is used to indicate a terminal device in some terminal device groups in the X terminal device groups to receive the paging PDSCH, and the some terminal device groups are at least two terminal device groups. Each of X indication states of the first indication information is used to indicate a terminal device in one of the X terminal device groups to receive the paging PDSCH.

Optionally, the first indication information is Y bits, and Y meets Y=ceil(log$_2$(X+1)), where ceil indicates rounding up. One indication state of the first indication information is used to indicate a terminal device in the X terminal device groups to receive the paging PDSCH. Each of X indication states of the first indication information is used to indicate a terminal device in one of the X terminal device groups to receive the paging PDSCH.

Optionally, the first indication information is a bitmap of X bits, the X bits are in a one-to-one correspondence with the X terminal device groups, and each of the X bits is used to indicate whether a terminal device in a corresponding terminal device group receives the paging PDSCH.

In some embodiments, a process in which each unit performs the foregoing corresponding step has been described in detail in the foregoing method embodiment. For brevity, details are not described herein again.

Figure 6:
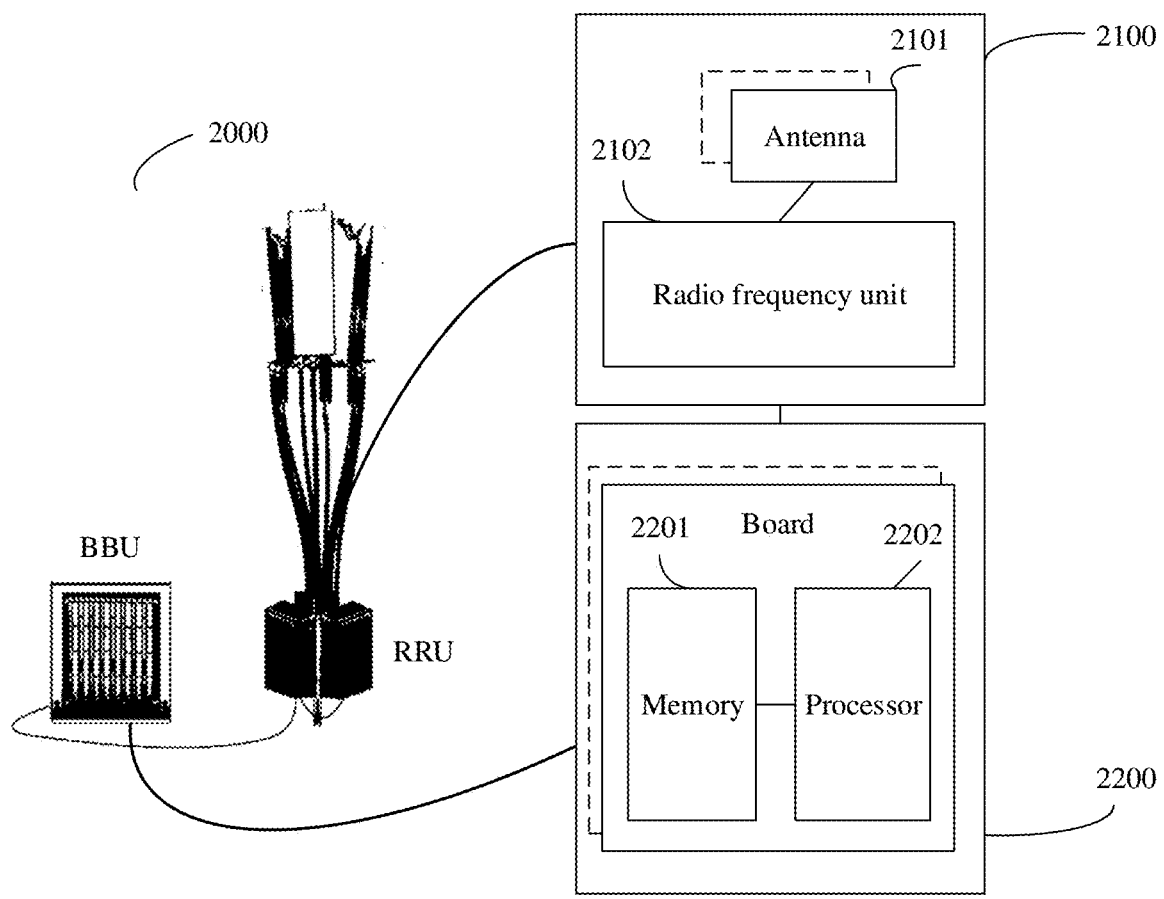
FIG. 6 is a schematic diagram of a structure of a network device in accordance with some embodiments.

In some embodiments, when the communication apparatus 1000 is the network device, the transceiver unit 1100 in the communication apparatus 1000 may correspond to an RRU 2100 in a network device 2000 shown in FIG. 6, and the processing unit 1200 in the communication apparatus 1000 may correspond to a BBU 2200 in the network device 2000 shown in FIG. 6. When the communication apparatus 1000 is the chip configured in the network device, the transceiver unit 1100 in the communication apparatus 1000 is an input/output interface.

Figure 7:
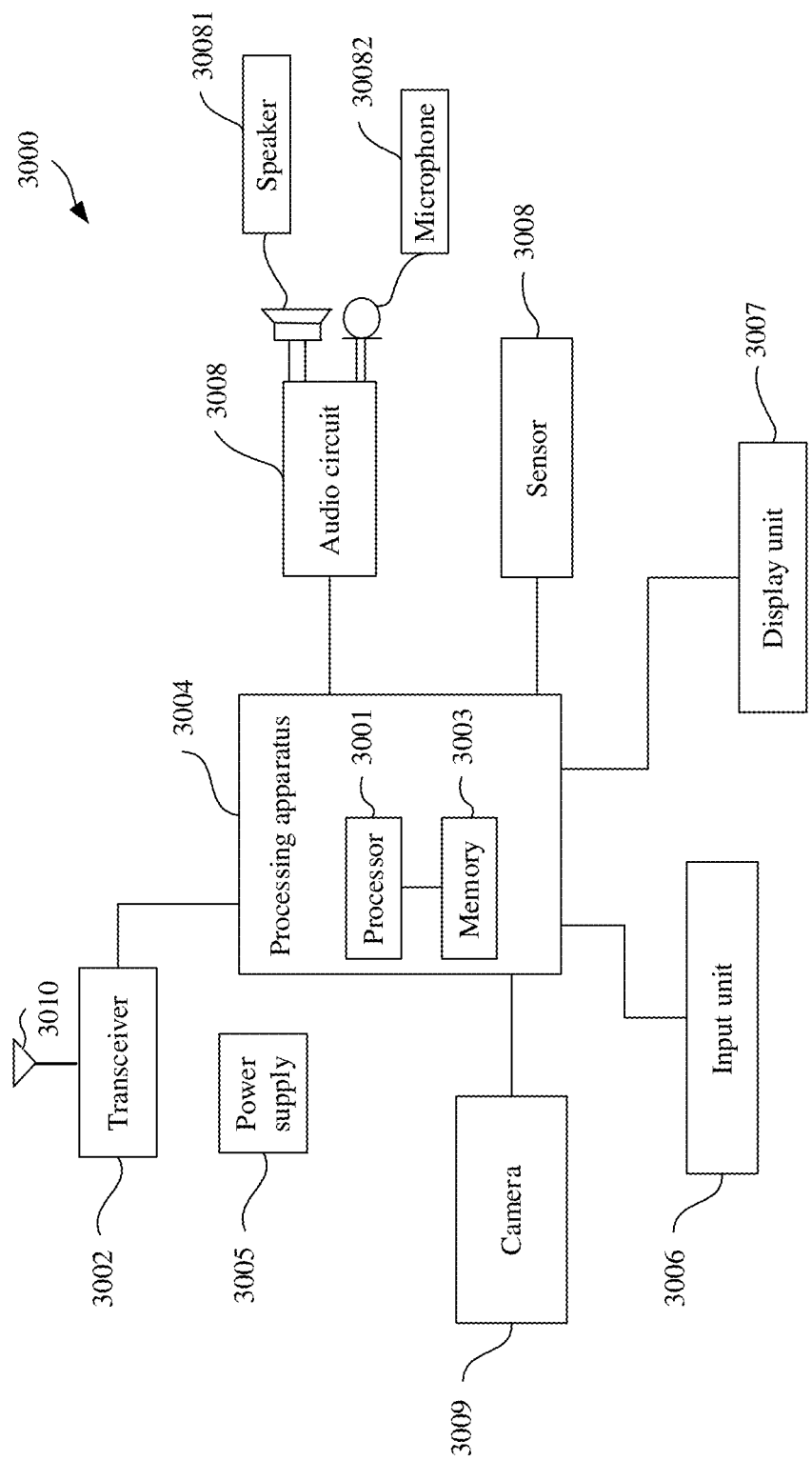
FIG. 7 is a schematic diagram of a structure of a terminal device in accordance with some embodiments.

In some embodiments, when the communication apparatus 1000 is the terminal device, the transceiver unit 1100 in the communication apparatus 1000 may correspond to a transceiver 3002 in a terminal device 3000 shown in FIG. 7, and the processing unit 1200 in the communication apparatus 1000 may correspond to a processor 3001 in the terminal device 3000 shown in FIG. 7.

FIG. 6 is a schematic diagram of a structure of the network device 2000 in accordance with some embodiments. The network device 2000 is used in the system shown in FIG. 1, and perform a function of the network device in the foregoing method embodiment. As shown in the figure, the network device 2000 includes one or more radio frequency units, for example, one or more remote radio units (RRUs) 2100, and one or more baseband units (BBUs) (which further is referred to as distributed units (DUs)) 2200. The RRU 2100 is referred to as a transceiver unit or a communication unit, and corresponds to the transceiver unit 1100 in FIG. 5. Optionally, the transceiver unit 2100 further is referred to as a transceiver machine, a transceiver circuit, a transceiver, or the like, and includes at least one antenna 2101 and a radio frequency unit 2102. Optionally, the transceiver unit 2100 includes a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 2100 is mainly configured to send and receive radio frequency signals and perform conversion between the radio frequency signal and a baseband signal. The BBU 2200 is mainly configured to: perform baseband processing, control the network device, and so on. The RRU 2100 and the BBU 2200 is physically disposed together, or is physically disposed separately, that is, in a distributed base station.

The BBU 2200 is a control center of the network device, or is referred to as a processing unit. The BBU 2200 may correspond to the processing unit 1200 in FIG. 5, and is mainly configured to implement baseband processing functions such as channel coding, multiplexing, modulation, and spectrum spreading. For example, the BBU (the processing unit) is configured to control the network device to perform an operation procedure related to the network device in the foregoing method embodiment.

In an example, the BBU 2200 includes one or more boards. A plurality of boards may jointly support a radio access network (for example, an LTE network) of a single access standard, or may separately support radio access networks (for example, an LTE network, a 5G network, or another network) of different access standards. The BBU 2200 further includes a memory 2201 and a processor 2202. The memory 2201 is configured to store instructions and data. The processor 2202 is configured to control the network device to perform an action, for example, is configured to control the network device to perform an operation procedure related to the network device in the foregoing method embodiment. The memory 2201 and the processor 2202 may serve one or more boards. In other words, a memory and a processor is separately disposed on each board. Alternatively, a plurality of boards may share a same memory and a same processor. In addition, a circuit is further disposed on each board.

In some embodiments, the network device 2000 shown in FIG. 6 implements processes related to the network device in the foregoing method embodiment. Operations or functions of modules in the network device 2000 are respectively intended to implement corresponding procedures in the foregoing method embodiment. For details, refer to the descriptions in the foregoing method embodiment. To avoid repetition, detailed descriptions are properly omitted herein.

The BBU 2200 is configured to perform an action that is implemented inside the network device and that is described in the foregoing method embodiment, and the RRU 2100 is configured to perform an action of receiving or sending that is performed by the network device from or to the terminal device and that is described in the foregoing method embodiment. For details, refer to the descriptions in the foregoing method embodiment. Details are not described herein again.

FIG. 7 is a schematic diagram of a structure of the terminal device 3000 in accordance with some embodiments. As shown in the figure, the terminal device 3000 includes the processor 3001 and the transceiver 3002. Optionally, the terminal device 3000 further includes a memory 3003. The processor 3001, the transceiver 3002, and the memory 3003 communicates with each other by using an internal connection path, to transfer a control signal and/or a data signal. The memory 3003 is configured to store a computer program. The processor 3001 is configured to invoke the computer program from the memory 3003 and run the computer program, to control the transceiver 3002 to send and receive signals.

The processor 3001 and the memory 3003 is integrated into one processing apparatus 3004. The processor 3001 is configured to execute program code stored in the memory 3003 to implement the foregoing functions. In some embodiments, the processing apparatus 3004 shown in the figure is an example. During implementation, the memory 3003 further is integrated into the processor 3001, or is independent of the processor 3001. This is not limited.

The terminal device 3000 further includes an antenna 3010, configured to send, by using a radio signal, uplink data or uplink control signaling output by the transceiver 3002.

In some embodiments, the terminal device 3000 shown in FIG. 7 implements processes related to the terminal device in the foregoing method embodiment. Operations or functions of modules in the terminal device 3000 are respectively intended to implement corresponding procedures in the foregoing method embodiment. For details, refer to the descriptions in the foregoing method embodiment. To avoid repetition, detailed descriptions are properly omitted herein.

Optionally, the terminal device 3000 further includes a power supply 3005, configured to supply power to various components or circuits in the terminal device.

In addition, to make functions of the terminal device more perfect, the terminal device 3000 further includes one or more of an input unit 3006, a display unit 3007, an audio circuit 3008, a camera 3009, a sensor 3008, and the like, and the audio circuit 3008 further includes a speaker 30081, a microphone 30082, and the like.

In some embodiments, the processing apparatus 3004 is a chip. For example, the processing apparatus 3004 is a field programmable gate array (FPGA), is a general-purpose processor, a digital signal processor (DSP), an application-specific integrated circuit (ASIC), the field programmable gate array (FPGA) or another programmable logic device, a discrete gate or a transistor logic device, or a discrete hardware component, is a system on chip (SoC), is a central processing unit (CPU), is a network processor (NP), is a digital signal processing circuit (DSP), is a micro controller unit (MCU), or is a programmable controller (PLD) or another integrated chip. The processing apparatus 3004 implements or performs methods, steps, and logical block diagrams that are disclosed in some embodiments. The general-purpose processor is a microprocessor, or the processor is any conventional processor or the like. The steps in the method disclosed with reference to some embodiments is directly performed and completed by a hardware decoding processor, or is performed and completed by using a combination of hardware in the decoding processor and a software module. The software module is located in a mature storage medium in the art, such as a random-access memory, a flash memory, a read-only memory, a programmable read-only memory, an electrically erasable programmable memory, or a register. The storage medium is in the memory, and the processor reads information in the memory and completes the steps in the foregoing method in combination with the hardware of the processor.

The memory 3003 is a volatile memory or a nonvolatile memory, or includes both a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random-access memory (RAM) and is used as an external cache. Through example but not limitative description, many forms of RAMs is used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In some embodiments, the memory in the system and the method described is intended to include, but not limited to, these memories and any memory of another proper type.

Some embodiments further provide a computer program product. The computer program product includes computer program code. When the computer program code is run on a computer, the computer is enabled to perform the method performed by the terminal device or the network device in any one of the foregoing method embodiments.

Some embodiments further provide a computer-readable medium. The computer-readable medium stores program code. When the program code is run on a computer, the computer is enabled to perform the method performed by the network device or the terminal device in the foregoing method embodiment.

Some embodiments further provide a system, including a terminal device and a network device.

Some embodiments further provides a processing apparatus, including a processor and an interface. The processor is configured to perform the method performed by the terminal device or the network device in any one of the foregoing method embodiments.

All or some of the foregoing embodiments is implemented by software, hardware, firmware, or any combination thereof. When software is used to implement the embodiments, all or some of the embodiments is implemented in a form of a computer program product. The computer program product includes one or more computer instructions. When the computer instructions are loaded or executed on a computer, the procedures or functions according to some embodiments are completely or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a high-density digital video disc (DVD)), a semiconductor medium (for example, a solid state disc (SSD)), or the like.

Terms such as "component", "module", and "system" in this specification are used to indicate computer-related entities, hardware, firmware, combinations of hardware and software, software, software being executed, or the like. For example, a component is but is not limited to a process that runs on a processor, a processor, an object, an executable file, a thread of execution, a program, or a computer. As shown in the figures, both a computing device and an application that runs on the computing device is components. One or more components may reside within a process or a thread of execution, and a component is located on one computer or distributed between two or more computers. In addition, these components is executed on various computer-readable media that store various data structures. The components communicates by using a local or remote process and based on, for example, a signal having one or more data packets (for example, data from two components interacting with another component in a local system, a distributed system, or across a network such as the Internet interacting with other systems by using the signal).

The "embodiment" mentioned in the entire specification means that particular features, structures, or characteristics related to the embodiment are included in at least one embodiment. Therefore, embodiments in the entire specification do not refer to a same embodiment. In addition, these particular features, structures, or characteristics is combined in one or more embodiments in any proper manner.

In some embodiments, numbers "first", "second", and the like are used to distinguish between different objects, for example, to distinguish between different network devices, and do not constitute a limitation on the scope of some embodiments. Embodiments are not limited thereto.

In some embodiments, "when" and "if" mean that a network element performs corresponding processing in an objective situation, but do not constitute a limitation on time, do not decide that the network element have a determining action during implementation, and do not mean any other limitation In some embodiments, "at least one" means one or more, and "a plurality of" means two or more.

In some embodiments , "B corresponding to A" indicates that B is associated with A, and B is determined based on A. However, in some embodiments, determining B based on A does not mean that B is determined based on A only, and B alternatively is determined based on A and/or other information.

In some embodiments, the term "and/or" in this specification describes an association relationship for describing associated objects and represents that three relationships exists. For example, A and/or B represents the following three cases: A exists, both A and B exist, and B exists. In addition, the character "/" in this specification indicates an "or" relationship between the associated objects.

Unless otherwise specified, an expression similar to "at least one of A, B, and C" in some embodiments is usually used to represent any one of the following: A; B; C; A and B; A and C; B and C; A, B, and C; A and A; A, A, and A; A, A, and B; A, and C; A, B, and B; C, and C; B and B; B, B, and B; B, B, and C; C and C; C, C, and C; and other combinations of A, B and C. In the foregoing descriptions, three elements A, B, and C are used as an example to describe an optional entry of the item. When more elements are included in the expression, a meaning of the expression is obtained according to the foregoing rule.

In some embodiments, the terminal device and/or the network device performs some or all the steps in some embodiments. These steps or operations are examples. In some embodiments, other operations or variations of various operations is further performed. In addition, the steps is performed in a sequence different from a sequence presented in some embodiments, and not the operations in some embodiments are to be performed.

A person of ordinary skill in the art is aware that, in combination with the units and algorithm steps in the examples described in the embodiments disclosed in this specification, some embodiments are implemented by using electronic hardware or a combination of computer software and electronic hardware. Whether the functions are performed by hardware or software depends on applications and design constraints of the technical solutions. A person skilled in the art is able to use different methods to implement the described functions for each particular application, but the implementation that goes beyond the scope is unrealistic.

A person skilled in the art that for the purpose of convenient and brief description, for a detailed working process of the described system, apparatus, and unit, refer to a corresponding process in the foregoing method embodiment. Details are not described herein again.

In several embodiments provided the disclosed system, apparatus, and method is implemented in other manners. For example, the described apparatus embodiments are examples. For example, division into the units is logical function division and is other division during actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in electrical, mechanical, or other forms.

The units described as separate parts are or are unable to be physically separate, and parts displayed as units are or are unable to be physical units, that is, is located in one position, or is distributed on a plurality of network units. Some or all the units are selected based on the objectives to achieve the solutions of embodiments.

In addition, function units in some embodiments is integrated into one processing unit, or each of the units exists alone physically, or two or more units is integrated into one unit.

When functions are implemented in a form of a software function unit and sold or used as an independent product, the functions is stored in a computer-readable storage medium. Based on such an understanding, the technical solutions in accordance with some embodiments, or the part contributing to the current technology, or some of the technical solutions is implemented in a form of a software product. The computer software product is stored in a storage medium, and includes several instructions for instructing a computer device (which is a personal computer, a server, a network device, or the like) to perform all or some of the steps of the method described in some embodiments. The foregoing storage medium includes any medium that stores program code, such as a USB flash drive, a removable hard disk, a ROM, a RAM, a magnetic disk, or an optical disc.

The foregoing descriptions are implementations in accordance with some embodiments, but are not intended to limit the protection scope. Any variation or replacement readily figured out by a person skilled in the art within the technical scope disclosed in some embodiments shall fall within the protection scope. Therefore, the protection scope in accordance with some embodiments shall be subject to the protection scope of the claims.

What is claimed is:

1. A communication method, comprising:
    determining, based on an identifier of a terminal device, that the terminal device belongs to a first terminal device group on a first paging occasion (PO), wherein:
        the first terminal device group is one of X terminal device groups on the first PO, where X is an integer greater than 1;
    sending paging downlink control information (DCI) on the first PO, wherein:
        the paging DCI includes first indication information used to indicate the terminal device in the first terminal device group to receive a paging physical downlink shared channel (PDSCH); and
    sending the paging PDSCH to the terminal device, wherein:
    the identifier is a user equipment identifier (UE_ID), the UE ID and the first terminal device group meet:
        x=floor (UE_ID/N/Ns) mod X, wherein:
            x is a number of the first terminal device group and an integer from 0 to X−1;
            floor indicates rounding down;
            N is a quantity of paging frames (PFs) included in a discontinuous reception (DRX) cycle;
            Ns is a quantity of POs included in a PF; and
            mod indicates modulo.

2. The communication method according to claim 1, wherein:
    the UE_ID and a 5G-short-temporary mobile subscriber identity (5G-S-TMSI) of the terminal device meet UE_ID=5G-S-TMSI mod (b×1024), and X meets X×N×Ns≤1024×b, wherein b is a positive integer power of 2.

3. The communication method according to claim 2, wherein:
    the UE_ID is 5G-S-TMSI mod 8192.

4. The communication method according to claim 3, wherein:
    N is 256, Ns is 4, and a maximum value of X is 8.

5. A communication method, comprising:
    determining, based on an identifier of a terminal device, that the terminal device belongs to a first terminal device group on a first paging occasion (PO), wherein:
        the first terminal device group is one of X terminal device groups on the first PO, where X is an integer greater than 1;
    receiving paging downlink control information (DCI) on the first PO, wherein:
        the paging DCI comprises first indication information used to indicate the terminal device in the first terminal device group to receive a paging physical downlink shared channel (PDSCH); and
    receiving the paging PDSCH based on the paging DCI, wherein:
    the identifier is a user equipment identifier (UE_ID), the UE_ID and the first terminal device group meet:
        x=floor (UE_ID/N/Ns) mod X, where x is a number of the first terminal device group and an integer from 0 to X−1;
        floor indicates rounding down;
        N is a quantity of paging frames (PFs) included in a discontinuous reception (DRX) cycle;
        Ns is a quantity of POs included in a PF; and
        mod indicates modulo.

6. The communication method according to claim 5, wherein:
    the UE_ID and a 5G-short-temporary mobile subscriber identity (5G-S-TMSI) of the terminal device meet UE_ID=5G-S-TMSI mod (b×1024), and X meets X×N×Ns≤1024×b, where b is a positive integer power of 2.

7. The communication method according to claim 6, wherein:
    the UE_ID is 5G-S-TMSI mod 8192.

8. The communication method according to claim 7, wherein:
    N is 256, Ns is 4, and a maximum value of X is 8.

9. A communication apparatus, comprises:
    a non-transitory memory storage that includes instructions; and
    one or more processors in communication with the non-transitory memory storage, wherein the instructions, when executed by the one or more processors, cause the one or more processors to:
        determine, based on an identifier of a terminal device, that the terminal device belongs to a first terminal device group on a first paging occasion (PO), wherein:
            the first terminal device group is one of X terminal device groups on the first PO, where X is an integer greater than 1;
        send paging downlink control information (DCI) on the first PO, wherein:
            the paging DCI includes first indication information used to indicate the terminal device in the first terminal device group to receive a paging physical downlink shared channel (PDSCH); and send the paging PDSCH to the terminal device, wherein:

the identifier is a user equipment identifier (UE_ID), the UE ID and the first terminal device group meet:

x=floor (UE_ID/N/Ns) mod X, where x is a number of the first terminal device group and an integer from 0 to X−1;

floor indicates rounding down;

N is a quantity of paging frames (PFs) included in a discontinuous reception (DRX) cycle;

Ns is a quantity of POs comprised in a PF; and mod indicates modulo.

10. The communication apparatus according to claim 9, wherein:

the UE_ID and a 5G-short-temporary mobile subscriber identity (5G-S-TMSI) of the terminal device meet UE_ID=5G-S-TMSI mod (b×1024), and X meets X×N×Ns≤1024×b, wherein b is a positive integer power of 2.

11. The communication apparatus according to claim 10, wherein:

the UE_ID is 5G-S-TMSI mod 8192.

12. The communication apparatus according to claim 11, wherein:

N is 256, Ns is 4, and a maximum value of X is 8.

13. A communication apparatus, comprising:

a non-transitory memory storage that includes instructions; and one or more processors in communication with the non-transitory memory storage, wherein the instructions, when executed by the one or more processors, cause the one or more processors to:

determine, based on an identifier of a terminal device, that the terminal device belongs to a first terminal device group on a first paging occasion (PO), wherein:

the first terminal device group is one of X terminal device groups on the first PO, where X is an integer greater than 1;

receive paging downlink control information (DCI) on the first PO, wherein:

the paging DCI includes first indication information used to indicate the terminal device in the first terminal device group to receive a paging physical downlink shared channel (PDSCH); and receive the paging PDSCH based on the paging DCI, wherein:

the identifier is a user equipment identifier (UE_ID), the UE ID and the first terminal device group meet:

x=floor (UE_ID/N/Ns) mod X, where x is a number of the first terminal device group and an integer from 0 to X−1;

floor indicates rounding down;

N is a quantity of paging frames (PFs) included in a discontinuous reception (DRX) cycle;

Ns is a quantity of POs included in a PF; and mod indicates modulo.

14. The communication apparatus according to claim 13, wherein:

the UE_ID and a 5G-short-temporary mobile subscriber identity (5G-S-TMSI) of the terminal device meet UE_ID=5G-S-TMSI mod (b×1024), and X meets X×N×Ns≤1024×b, wherein b is a positive integer power of 2.

15. The communication apparatus according to claim 14, wherein:

the UE_ID is 5G-S-TMSI mod 8192.

16. The communication apparatus according to claim 13, wherein:

N is 256, Ns is 4, and a maximum value of X is 8.

* * * * *